(12) United States Patent
Rice

(10) Patent No.: US 12,504,729 B2
(45) Date of Patent: Dec. 23, 2025

(54) MONITORING APPARATUS AND SYSTEM

(71) Applicant: Imprenditore Pty Limited, Armidale (AU)

(72) Inventor: Patrick Rice, Brisbane (AU)

(73) Assignee: Imprenditore Pty Limited, Armidale (AU)

( * ) Notice: Subject to any disclaimer, the term of this patent is extended or adjusted under 35 U.S.C. 154(b) by 0 days.

(21) Appl. No.: 18/407,287

(22) Filed: Jan. 8, 2024

(65) Prior Publication Data

US 2024/0219874 A1 Jul. 4, 2024

Related U.S. Application Data

(63) Continuation of application No. 17/121,201, filed on Dec. 14, 2020, now Pat. No. 11,868,102, which is a
(Continued)

(30) Foreign Application Priority Data

Jul. 12, 2006 (AU) ................................ 2006903740
May 4, 2007 (AU) ................................ 2007902358

(51) Int. Cl.
*G05B 15/02* (2006.01)
*G06F 11/30* (2006.01)
(Continued)

(52) U.S. Cl.
CPC .......... *G05B 15/02* (2013.01); *G06F 11/3089* (2013.01); *G06F 21/6218* (2013.01);
(Continued)

(58) Field of Classification Search
None
See application file for complete search history.

(56) References Cited

U.S. PATENT DOCUMENTS 4,621,263 A 11/1986 Takenaka et al.
5,708,964 A 1/1998 Meger et al.
(Continued)

FOREIGN PATENT DOCUMENTS

CA 2624186 A1 4/2007
JP 03071297 A 3/1991
(Continued)

OTHER PUBLICATIONS

International Search Report issued on Jul. 21, 1999 for PCT/US98/25407.
Written Opinion issued on Aug. 19, 2008 for PCT/AU2007/000958.

*Primary Examiner* — Thomas S Mccormack
(74) *Attorney, Agent, or Firm* — Burdick Patents, P.A.; Sean D. Burdick; Colin L. Honan

(57) ABSTRACT

A monitoring system and associated methodology for response to incidents sensed by at least one sensor of an individual signal unit includes transmission to a central control facility by the individual signal unit, of at least a unique identifying code for that individual signal unit, over a communication network; the response includes a transmission of data from said central control facility to one or more recipients nominated by a registered owner of the individual signal unit wherein registration of the individual signal unit and configuration of sensing and of said response is via a web-based interface.

20 Claims, 34 Drawing Sheets

Related U.S. Application Data continuation of application No. 16/417,265, filed on May 20, 2019, now Pat. No. 10,866,570, which is a continuation of application No. 14/667,903, filed on Mar. 25, 2015, now Pat. No. 10,295,967, which is a continuation of application No. 13/846,531, filed on Mar. 18, 2013, now abandoned, which is a continuation of application No. 12/373,506, filed as application No. PCT/AU2007/000958 on Jul. 12, 2007, now Pat. No. 8,446,276.

(51) Int. Cl.
*G06F 21/62* (2013.01)
*H04B 7/185* (2006.01)
*H04L 67/025* (2022.01)
*H04L 67/12* (2022.01)

(52) U.S. Cl.
CPC ......... *H04B 7/1851* (2013.01); *H04L 67/025* (2013.01); *H04L 67/12* (2013.01); *Y04S 40/18* (2018.05)

(56) References Cited

U.S. PATENT DOCUMENTS

| | | | |
|---|---|---|---|
| 5,845,230 | A | 12/1998 | Lamberson |
| 5,907,279 | A | 5/1999 | Bruins et al. |
| 5,933,080 | A | 8/1999 | Nojima |
| 6,026,165 | A | 2/2000 | Marino et al. |
| 6,239,700 | B1 | 5/2001 | Hoffman et al. |
| 6,437,692 | B1 | 8/2002 | Petite et al. |
| 6,526,442 | B1 | 2/2003 | Stupek, Jr. et al. |
| 6,553,336 | B1 | 4/2003 | Johnson et al. |
| 6,580,950 | B1 | 6/2003 | Johnson et al. |
| 6,693,530 | B1 | 2/2004 | Dowens et al. |
| 6,788,200 | B1 | 9/2004 | Jamel et al. |
| 6,795,823 | B1 | 9/2004 | Aklepi et al. |
| 6,924,727 | B2 | 8/2005 | Nagaoka et al. |
| 6,935,959 | B2 | 8/2005 | Danieli et al. |
| 6,943,682 | B1 | 9/2005 | Dowens et al. |
| 6,982,656 | B1 | 1/2006 | Coppinger et al. |
| 7,002,470 | B1 * | 2/2006 | Miao ............... H04B 1/71635 340/539.22 |
| 7,079,027 | B2 | 7/2006 | Wojcik |
| 7,088,240 | B2 | 8/2006 | Inata et al. |
| 7,102,493 | B1 | 9/2006 | Coppinger et al. |
| 7,113,090 | B1 | 9/2006 | Saylor et al. |
| 7,167,094 | B2 | 1/2007 | Ciarcia, Jr. et al. |
| 7,213,061 | B1 | 5/2007 | Hite et al. |
| 7,248,161 | B2 | 7/2007 | Spoltore et al. |
| 7,319,412 | B1 | 1/2008 | Coppinger et al. |
| 7,348,882 | B2 | 3/2008 | Adamczyk et al. |
| 7,403,116 | B2 | 7/2008 | Bittner |
| 7,526,539 | B1 | 4/2009 | Hsu |
| 7,555,528 | B2 | 6/2009 | Rezvani et al. |
| 7,685,465 | B1 | 3/2010 | Shaw et al. |
| 7,746,224 | B2 | 6/2010 | Addy |
| 7,747,898 | B1 | 6/2010 | Shaw et al. |
| 7,760,109 | B2 | 7/2010 | Broad et al. |
| 8,020,104 | B2 | 9/2011 | Robarts et al. |
| 8,446,276 | B2 | 5/2013 | Rice |
| 9,064,392 | B2 | 6/2015 | Lee et al. |
| 9,716,675 | B2 | 7/2017 | Choi et al. |
| 10,295,967 | B2 | 5/2019 | Rice |
| 10,551,801 | B2 | 2/2020 | Rice |
| 10,866,570 | B2 | 12/2020 | Rice |
| 11,706,100 | B2 | 7/2023 | Poteat et al. |
| 11,706,586 | B2 | 7/2023 | Carraway |
| 11,868,102 | B2 * | 1/2024 | Rice ................ H04L 67/025 |
| 11,910,279 | B2 | 2/2024 | Wu et al. |
| 2002/0021231 | A1 * | 2/2002 | Schlager ......... G08B 21/0269 340/984 |
| 2002/0080025 | A1 | 6/2002 | Beattie |
| 2002/0180579 | A1 | 12/2002 | Nagaoka et al. |
| 2003/0012344 | A1 | 1/2003 | Agarwal et al. |
| 2003/0069002 | A1 | 4/2003 | Hunter et al. |
| 2003/0076369 | A1 | 4/2003 | Resner et al. |
| 2003/0117280 | A1 | 6/2003 | Prehn |
| 2003/0221004 | A1 | 11/2003 | Stupek et al. |
| 2003/0229559 | A1 | 12/2003 | Panttaja et al. |
| 2004/0004547 | A1 | 1/2004 | Appelt et al. |
| 2004/0059815 | A1 | 3/2004 | Buckingham et al. |
| 2004/0145471 | A1 | 7/2004 | Lawrenson et al. |
| 2004/0201471 | A1 | 10/2004 | Primm et al. |
| 2004/0202154 | A1 | 10/2004 | Aklepi et al. |
| 2004/0263321 | A1 * | 12/2004 | Hair, III .............. H04B 3/548 340/870.07 |
| 2005/0101334 | A1 | 5/2005 | Brown et al. |
| 2005/0124318 | A1 | 6/2005 | Jeon |
| 2005/0128080 | A1 | 6/2005 | Hall et al. |
| 2005/0128295 | A1 * | 6/2005 | Addy ............... G08B 13/19669 348/143 |
| 2005/0131551 | A1 | 6/2005 | Ruutu et al. |
| 2005/0159905 | A1 | 7/2005 | Bond et al. |
| 2005/0198121 | A1 | 9/2005 | Daniels et al. |
| 2005/0216302 | A1 | 9/2005 | Raji et al. |
| 2005/0235058 | A1 | 10/2005 | Rackus et al. |
| 2005/0264412 | A1 | 12/2005 | Levesque et al. |
| 2005/0275549 | A1 | 12/2005 | Barclay et al. |
| 2006/0027677 | A1 | 2/2006 | Abts |
| 2006/0047360 | A1 | 3/2006 | Burns et al. |
| 2006/0202819 | A1 | 9/2006 | Adamczyk et al. |
| 2006/0253598 | A1 | 11/2006 | Nakamura et al. |
| 2007/0046459 | A1 | 3/2007 | Silverman et al. |
| 2007/0073708 | A1 | 3/2007 | Smith et al. |
| 2007/0115108 | A1 | 5/2007 | Martin et al. |
| 2007/0194914 | A1 | 8/2007 | Gates |
| 2008/0042825 | A1 | 2/2008 | Denny et al. |
| 2008/0224848 | A1 | 9/2008 | Meyer |
| 2008/0287109 | A1 | 11/2008 | Marett et al. |
| 2010/0115093 | A1 | 5/2010 | Rice |
| 2012/0157037 | A1 | 6/2012 | Hoffman et al. |
| 2014/0059393 | A1 | 2/2014 | Rice |
| 2014/0167983 | A1 | 6/2014 | Rude et al. |
| 2015/0019018 | A1 | 1/2015 | Rice |
| 2015/0261198 | A1 | 9/2015 | Rice |
| 2018/0196398 | A1 | 7/2018 | Rice |
| 2021/0181699 | A1 | 6/2021 | Rice |
| 2021/0380014 | A1 | 12/2021 | Hishida et al. |

FOREIGN PATENT DOCUMENTS

| | | |
|---|---|---|
| JP | 2002190871 A | 7/2002 |
| JP | 2002230670 A | 8/2002 |
| JP | 2003027530 B | 1/2003 |
| JP | 2003085677 A | 3/2003 |
| JP | 2004007444 A | 1/2004 |
| JP | 2004240574 A | 8/2004 |
| JP | 2006003931 A | 1/2006 |
| JP | 2006089021 B | 4/2006 |
| WO | 9706499 A1 | 2/1997 |
| WO | 9735432 A1 | 9/1997 |
| WO | 0033049 A1 | 6/2000 |
| WO | 0033070 A1 | 6/2000 |
| WO | 0072183 A2 | 11/2000 |
| WO | 2003088508 A3 | 10/2003 |
| WO | 2006036807 A2 | 4/2006 |
| WO | 2007038515 A2 | 4/2007 |

* cited by examiner

I.S.U

Portable. Affordable. Compact. Compatable. Safe. Easy. Effective. Plug it in.

| Configure | New Products | ISU Friendly Sites | Service Links | Pricing | Contact |

128

How would you like to be notified?

☐ Phone ☐ Confirm    ☑ SMS ☐ Confirm — 128    ☑ Service ☑ Confirm — 128

[                ]   [0402504944]              [Chubb ▶]

☑ Fax ☐ Confirm      ☐ Email ☐ Confirm         * This notification will not
                                                 be sent until confirmation
[0741231234]         [price@ricedevelopme]       is received Multiple numbers and addresses will be
available in completed site.

Prev                                                          Finish

Portable. Affordable. Compact. Compatable. Safe. Easy. Effective. Plug it in.

| Configure | New Products | ISU Friendly Sites | Service Links | Pricing | Contact |
|---|---|---|---|---|---|

| Name | Last Status | Current Status | Last Event | Event Time | Occurrences | Confirmation |
|---|---|---|---|---|---|---|
| Site Office Door | OK | OK | None | None | 0 | NA |
| Toolbox 1 | ALARM | WAITING | Opened | 05:41 20/11/2006 | 2 | Required |
| Grandma | ALARM | OK | Button Pressed | 04:30 19/11/2006 | 1 | Received |
| Paddy's Car | TRACKING | TRACKING | Position Updated | 05:59 20/11/2006 | 452 | NA |

— 136 (arrow pointing to 05:41 20/11/2006)

134 (brace)

Prev   Next

Fig. 19

Scenario Three Cars

Modern cars have devices for collecting an enormous variety of data, all of which is brought back to a central source within the car.

Attach an ISU at this point and a new vista opens up:

| Source | Data collected | Use for Data |
|---|---|---|
| Odometer Data | | 1: Hire car monitoring and charging<br>2: Trip monitoring and log books<br>3: Car servicing |
| Petrol consumption Data | | 1: Hire car monitoring and charging<br>2: Trip monitoring<br><br>Petrol consumption data could be used to compare relative petrol used by different models of cars and drivers |
| Performance data | • Water and oil levels<br>• Water and oil temperatures | 1: Car servicing<br>2: Hire car monitoring and charging |
| Speedo data | • Detect the fact that a car is being driven<br>• Detect rapid deceleration and acceleration<br>• Detect speeding | 1: Hire car monitoring and charging<br>2: Detect the car has been stolen<br>2: Detect car accident and calculate its seriousness |

Fig. 21

Function — Scenario two | Cars

| Source | Data collected | Use for Data |
|---|---|---|
| Door lock status | | 1: Car stolen<br>Lock or deadlock car<br>2: Car left unlocked<br>Algorithms could be used to suggest that the car has been left unattended and unlocked and/or without the ISU security system enabled<br>3: Keys lost<br>If an owner loses their keys and they are worried about the finder of the keys gaining access to their car they could SMS ISU to lock the car and not respond to efforts to unlock it until instructed otherwise via the ISU network. |
| In car computing and entertainment | | 1: An ISU can provide internet access which can be used for:<br>• Configuring the ISU<br>• Downloading music and videos<br>• Gaining access to a home computer<br>• Surfing – booking accommodation for the rest of the trip viewing maps<br>• Email collection |
| Add action devices Data | • Car immobilisation<br>• Car alarm | 1: Car stolen<br>• Immobilise car<br>• Car frightening sequence – sound alarm, sound recorded on entertainment system, sound car horn and flash lights |
| Store information | Download on demand | 1: Hire car monitoring and charging<br>2: Remote servicing<br>Data on the operation of a car can be relayed to a mechanic who can then provide advice and instructions for repair of the car. This could be very important for breakdowns in remote country |

Fig. 22

Scenario Three  Cars

| Potential Use | ISU role | |
|---|---|---|
| | Measure | Control |
| Notification of unauthorised use | Doors open, windows broken, car started (with or without key), lock status | Alarm; warning to owner and/or security firm, immobilisation device |
| Recover stolen vehicles | Location – triangulation | Information to owner and/or security firm |
| Road accident early notification | Shocks, speed, deceleration | Information to owner and/or security firm |
| Damage to stationary vehicle – e.g. in car park | Shocks | Information to owner |
| Improve Taxi Driver safety | Duress alarm, location – triangulation | Information to head office and/or security firm |
| Reliable log books | Ignition on and off, triangulation of location, time | Store data for RTA inspection |
| Emission control – carbon credits, government control, fuel efficiency | Exhaust composition | Store data for later inspection, motor adjustment |
| Reduce mistreatment of vehicles | Speedometer – speeds, acceleration, deceleration, rpm | Routine download for inspection by hire firm |
| Locate a broken down or crashed vehicle | Location – triangulation | Information to Road Service firm |
| Regular servicing notification | Odometer | Inform service firms and owner |
| Notification when user maintenance is required | Water and oil levels, water and oil temperatures | Inform owner |
| Prevent dangerous cabin situations | Movement in cabin and cabin temperature | Inform owner |

Fig. 23

Scenario Three  Cars | Car Servicing | Registration

ISU Web site – user setting up the car-servicing module for their car ISU

| Potential Use | New Products | ISU Friendly Sites | Service Links | Pricing | Contact |
|---|---|---|---|---|---|

MONITOR ANYTHING, ANYWHERE, ANYTIME.

ISU car-servicing registration / Performance service options

You have selected the following three service companies to provide quotes for your regular car services. Performance scores are average improvement in engine performance. Satisfaction scores indicate how satisfied people have been with their service.

| Companies | ISU Score out of 10 | |
|---|---|---|
| Fred's Audi | Performance: 8 | Satisfaction: 7 |
| John Brown Mechanic | Performance: 9 | Satisfaction: 6 |
| Agathas Full Car Servicing | Performance: 6 | Satisfaction: 9.5 |

Scenario Three  Cars | Car Servicing | Registration

ISU Web site - user setting up the car-servicing module for their car ISU

| Potential Use | New Products | ISU Friendly Sites | Service Links | Pricing | Contact |

MONITOR ANYTHING, ANYWHERE, ANYTIME.

ISU car-servicing registration

/ Service Companies / Performance service options \

Please select which of the following you would like to be monitored o your car.

☐ Pollution monitoring - increasing pollution from your car not only harms the environment but also indicates a poorly fuctioning car.

☐ Oil/water and charge warnings

☐ Performance metrics

☐ Regular service timings

Fig. 25

Scenario Three — Car Servicing | Servicing

When the Odometer reaches the Target Mileage:

SMS/email to 3 Car Mechanics:

"ISU Car Service Monitoring: The Audi XYZ belonging to Joe Smith is now due for a 20,000 km service. Please reply with a quote and the next three available appointment times available for providing this service."

After receiving the replies the following would be sent to the owner:

"ISU Car Service Monitoring: Your Audi XYZ is now due for a 20,000km service and the following prices and available appointment times have been provided:"

| Reply | Company Name | Quote | Dates available |
|---|---|---|---|
| 1 | Fred's Audi | $150.00 | Monday 2 July – Wednesday 5 July |
| 2 | John Brown Mechanic | $120.00 | Thursday 6 July, Monday 10, Tuesday 11 |
| 3 | Agathas Full Car Servicing | $250.00 | Anytime – anything for you babe |

Fig. 26

Scenario Three Car Servicing | Servicing

ISU marketing to servicing providers

| Potential Use | New Products | ISU Friendly Sites | Service Links | Pricing | Contact |
|---|---|---|---|---|---|

MONITOR ANYTHING, ANYWHERE, ANYTIME

Information displayed by service providers on ISU website

ISU providers registration

Service Companies | Performance service options

Specialities

Makes:

Service: < Select from list >
Exhaust
Engine Reconditioning
Registration Checks
Transmission Name:
Address:
Phone:
Mobile 1
Mobile 2:
Email:
Web:
Sales Comment (less than 50 words)

Fig 27

Scenario Three  Car | Car Servicing | Servicing

ISU pricing to car servicing providers

| Promotion categories | Price ($ per month) |
|---|---|
| Inclusion on site | $100.00 |
| Top three of list | extra $1000.00 |
| Include in default list | extra $1500 |
| Opportunity to quote on all services | extra $2000.00 |
| First page | extra $200 |
| Access to web page | extra $0.50 per click |
| Alternatively, let ISU choose your promotion in return for a 15% commission on all accepted quotes | |

Fig. 28

MONITORING APPARATUS AND SYSTEM

RELATED APPLICATION

The present application relates to and claims the benefit of priority to U.S. patent application Ser. No. 13/846,531 filed Mar. 18, 2013, which is a continuation of U.S. patent application Ser. No. 12/373,506 filed Jan. 12, 2009, which is a 371 nationalization of PCT/AU2007/000958 filed Jul. 12, 2017, all which are hereby incorporated by reference in their entirety for all purposes as if fully set forth herein.

FIELD OF INVENTION

The present invention relates to error and incident reporting apparatus and systems and, more particularly, to a system adapted to monitoring and acting upon status signals emanating from widely diverse and geographically separated installations.

BACKGROUND

The efficient functioning of modern societies relies on innumerable discrete items of infrastructure. In many cases, particularly where such items are located in remote or difficult to reach or monitor locations, a malfunction or adverse incident may remain undetected for considerable lengths of time causing inconvenience, economic loss or even potentially hazardous situations.

Regular inspection of many such items of infrastructure in remote areas, for example irrigation sluices, gates, stock watering troughs etc is usually impractical. Similar impracticality or prohibitive expense is associated with the monitoring for example of such items as tool sheds at building sites, tool boxes on trucks, and equipment and plant remaining on construction sites etc.

The need for monitoring is of course not restricted to remote areas. Security and status of equipment, buildings and vehicles and the like is important everywhere. However, setting up a monitoring system is frequently a complicated procedure, often involving complex wiring of hardware installations, site visits by professional personnel.

It is an object of the present invention to address or at least ameliorate some of the above disadvantages.

NOTE

1. The term "comprising (and grammatical variations thereof) is used in this specification in the inclusive sense of "having or "including, and not in the exclusive sense of "consisting only of.
2. The terms "owner", "user", "registered user are used interchangeably in this specification for any person authorised to predefine the steps to be executed in response to a signal from an individual signal unit (ISU).

SUMMARY OF THE INVENTION

Accordingly, in one broad form of the invention, there is provided an infrastructure monitoring system; said apparatus including a plurality of geographically disparate individual signal units in communication with a central control facility via at least one communication satellite; said individual signal units adapted to change from a first stand-by state to a second powered up state on the occurrence of a change of status of an item of said infrastructure; each device of said individual signal units transmitting a signal to said central control facility during said powered up state; said signal triggering a programmed predefined sequence of responses; each said device returning to said stand-by state after transmission of a said signal.

Preferably, each of said individual signal units is provided with a unique signal unit identification code; said unique identification code comprising said signal transmitted to said central control facility.

Preferably, each of said individual signal units is provided with a signal transceiver module.

Preferably, each of said individual signal units is provided with a rechargeable power supply.

Preferably, said rechargeable power supply is recharged by a solar cell array.

Preferably, each said individual signal units is provided with at least one external event sensor.

Preferably, said at least one external event sensor is adapted to respond to a change in status of a said item of infrastructure.

Preferably, a said individual signal unit receives an input signal from said at least one external event sensor at said change of status.

Preferably, each said at least one external event sensor is associated with a unique sequence of repeat transmissions of said unique identification code; said unique sequence of repeat transmissions comprising said signal transmitted to said central control facility. Preferably, each of said individual signal units is provided with an external event sensor interface adapted to monitor signals from at least one remote external event sensor.

Preferably, each of said individual signal units is provided with tamper monitoring means; said tamper monitoring means associated with one said unique sequence of repeat transmissions of said unique identification code.

Preferably, said central control facility includes a transceiver module in communication with said at least one satellite.

Preferably, said transceiver module is linked to server and data storage devices; said server and data storage devices adapted to process signals received from any one of said individual signal units.

Preferably, said server and data storage devices are adapted to initiate any of a plurality of pre-programmed outputs; said outputs dependent on said unique identification code and said unique sequence of repeat transmissions of said unique identification code comprising a received said signal.

Preferably, said server and data storage devices are adapted to initiate coded data for transmission to said individual signal units.

Preferably, said coded data transmitted to a said individual signal unit includes instructions for programmed responses by a said individual signal unit to inputs received from said one or more external event sensors.

Preferably, a said individual signal unit is provided with at least one output relay, said at least one output relay adapted to control an external device.

Preferably, said server and data storage devices are adapted to initiate predetermined communications to at least one nominated recipient, said communications dependent on signals received from a said individual signal unit.

Preferably, said at least one nominated recipient is a registered user of said monitoring system.

Preferably, said at least one nominated recipient is a service provider to said monitoring system.

Preferably, a said registered user of said monitoring system is enabled to register a said individual signal unit with said central control facility over the Internet.

Preferably, registration of said individual signal unit includes provision of data relevant to responses to external sensor events by said individual signal unit and by said central control facility.

In a further broad form of the invention there is provided a method for monitoring the status of at least one aspect of geographically disparate items of infrastructure; said method including the steps of:
 (a) installing an individual signal unit at each of said items of infrastructure,
 (b) providing said individual signal unit with at least one external event sensor and a signal transceiver,
 (c) linking said individual signal unit with a central control facility via a satellite link,
 (d) providing said central control facility with server and data storage devices; said devices adapted to execute pre-programmed responses to a signal received from a said individual signalling device.

Preferably, each said individual signal unit includes:
 (a) a transceiver module,
 (b) a rechargeable power supply and power control module,
 (c) a logic circuit,
 (d) at least one external event sensor.

Preferably, said method includes the further steps of:
 (a) providing each said individual signal unit with a unique individual signal unit identification code,
 (b) associating a unique sequence of repeat transmission of said identification code for each said external event sensor,
 (c) programming said individual signal unit to transmit a signal comprising said unique sequence of repeat transmission identification code of said individual signal unit to said central control facility on the occurrence of a change of said status of a said item of infrastructure,
 (d) executing said pre-programmed responses to a signal received from a said individual signalling device.

Accordingly, in a first broad form of the invention, there is provided an apparatus and monitoring system for response to incidents sensed by at least one sensor of an individual signal unit, said response comprising in a first instance, transmission to a central control facility by a said individual signal unit, of at least a unique identifying code for that individual signal unit, over a communication network, said response comprising in a second instance, transmission of data from said central control facility to one or more recipients nominated by a registered owner of said individual signal unit; and wherein registration of a said individual signal unit and configuration of sensing and of said response is via a web-based interface. Preferably, said response in said first instance includes digital or analogue data input to said individual signal unit.

Preferably, said digital or analogue data is transmitted to said central control facility in real time.

Preferably, said digital or analogue data is stored, prior transmission, on a data storage device of said individual signal unit.

Preferably, said at least one sensor is incorporated within said individual signal unit.

Preferably, said at least one sensor is an external sensor connected to an input port of said individual signal unit.

Preferably, said individual signal unit further includes a rechargeable power Supply.

Preferably, said rechargeable power supply is recharged by a solar cell array.

Preferably, said web-based interface includes at least one web page; said web page provided with at least one data entry field.

Preferably, each of said individual signal units is provided with a unique individual signal unit identification code; said unique identification code comprising said signal transmitted to said central control facility.

Preferably, each said at least one external event sensor is associated with a unique sequence of repeat transmissions of said unique identification code; said unique sequence of repeat transmissions comprising said signal transmitted to said central control facility.

Preferably, of each said individual signal units is provided with at least one external event sensor.

Preferably, said at least one external event sensor is adapted to respond to a change in Stimulus of said sensor.

Preferably, said at least one external event sensor is adapted to respond to a predefined stimulus.

Preferably, a said individual signal unit receives an input signal from said at least one external event sensor at said change in stimulus.

Preferably, said central control facility includes a transceiver module in communication with said communication network.

Preferably, said transceiver module is linked to server and data storage devices; said server and data storage devices adapted to process signals received from any one of said individual signal units.

Preferably, said server and data storage devices are adapted to initiate at least one pre-programmed outputs; said output or outputs dependent on said unique identification code.

Preferably, a said individual signal unit is provided with at least one input, said at least one input adapted to communicate with one said sensor.

Preferably, a said individual signal unit is provided with at least one output, said at least one output adapted to control an external device.

Preferably, said server and data storage devices are adapted to initiate predetermined communications to at least one nominated recipient; said communications dependent on a signal received from a said individual signal unit.

Preferably, said at least one nominated recipient is an owner of a said individual signal unit registered with said monitoring system.

Preferably, said at least one nominated recipient is a service provider nominated by said owner of a said individual signal unit.

In a further broad form of the invention, there is provided an individual signal unit; each said individual signal unit including:
 (a) a transceiver module,
 (b) a rechargeable power supply and power control module,
 (c) a logic circuit,
 (d) at least one external event sensor,
 and wherein a signal from a said individual signal unit to a central control facility causes said central control facility to execute a number of predefined steps; said predefined steps configured by an owner of said individual signal unit.

In another broad form of the invention, there is provided a monitoring system; said apparatus comprising an individual signal unit and at least one owner selectable sensor connected to said individual signal unit; said individual signal unit and said at least one sensor registered by said user with a central control facility; wherein said individual signal unit is programmed to transmit a unique device identification code to said central control facility when said at least one sensor detects an incident, said central control facility responding to a transmitted said unique device identification code according to protocols established at registration of said unit by said OW.

In yet a further broad form of the invention, there is provided a monitoring system enabled by the internet and a communication system; said system including a number of individual signal units; each of said devices connected to at least one owner selectable sensor; each of said individual signal units and said at least one sensor registered with a central control facility by said owner over said internet; said central control facility responding to an incident sensed by a said sensor according to protocols established at registration by a said owner.

In yet a further broad form of the invention, there is provided a method of monitoring the status of an item of interest; said method including the steps of:
 (a) purchase by an owner of an individual signal unit and at least one user selectable sensor for connection to said device,
 (b) registering said individual signal unit and said at least one sensor with a central control facility,
 (c) configuring a response executable by said central control facility on receipt by said facility of a signal transmitted by said individual signal unit.

Preferably, said signal comprises a unique identifying code of said individual signal unit.

Preferably, said registering of a said individual signal unit includes the steps of:
 (d) accessing a web site maintained by said central control facility,
 (e) establishing a user name and password with said central control facility,
 (f) entering into said web site a registration code of said individual signal unit,
 (g) entering a user selected identifier name for said individual signal unit,
 (h) entering details of one or more sensors to be connected to said individual signal unit,
 (i) entering details of said response executable by said central control facility.

In another broad form of the invention, there is provided a method for monitoring the status of at least one aspect of geographically disparate items of infrastructure; said method including the steps of
 (a) installing an individual signal unit at each of said items of infrastructure,
 (b) providing said individual signal unit with at least one external event sensor and a signal transceiver,
 (c) linking said individual signal unit with a central control facility via a communication network,
 (d) providing said central control facility with server and data storage devices; said devices adapted to execute pre-programmed responses to a signal received from a said individual signalling device.

In still another broad form of the invention, there is provided apparatus of an infrastructure monitoring system; said apparatus including a plurality of geographically disparate individual signalling devices in communication with a central control facility via at least one communication satellite; said individual signalling devices adapted to change from a first stand-by state to a second powered up state on the occurrence of a change of status of an item of said infrastructure; each device of said individual signalling devices transmitting a signal to said central control facility during said powered up state; said signal triggering a programmed predefined sequence of responses; each said device returning to said stand-by state after transmission of a said signal.

Preferably, each of said individual signalling devices is provided with a unique signalling device identification code: said unique identification code comprising said signal transmitted to said central control facility.

Preferably, each of said individual signalling devices is provided with a signal transceiver module.

Preferably, each of said individual signalling devices is provided with a rechargeable power Supply. Preferably, said rechargeable power supply is recharged by a Solar cell array.

Preferably, each said individual signalling devices is provided with at least one external event sensor.

Preferably, said at least one external event sensor is adapted to respond to a change in status of a said item of infrastructure.

Preferably, a said individual signalling device receives an input signal from said at least one external event sensor at said change of status.

Preferably, each said at least one external event sensor is associated with a unique sequence of repeat transmissions of said unique identification code; said unique sequence of repeat transmissions comprising said signal transmitted to said central control facility.

Preferably, each of said individual signalling devices is provided with an external event sensor interface adapted to monitor signals from at least one remote external event sensor.

Preferably, each of said individual signalling devices is provided with tamper monitoring means; said tamper monitoring means associated with one said unique sequence of repeat transmissions of said unique identification code.

Preferably, said central control facility includes a transceiver module in communication with said at least one satellite.

Preferably, said transceiver module is linked to server and data storage devices; said server and data storage devices adapted to process signals received from any one of said individual signalling devices.

Preferably, said server and data storage devices are adapted to initiate any of a plurality of pre-programmed outputs; said outputs dependent on said unique identification code and said unique sequence of repeat transmissions of said unique identification code comprising a received said signal.

Preferably, said server and data storage devices are adapted to initiate coded data for transmission to said individual signalling devices.

Preferably, said coded data transmitted to a said individual signalling device includes instructions for programmed responses by a said individual signalling device to inputs received from said one or more external event sensors.

Preferably, a said individual signalling device is provided with at least one output relay, said at least one output relay adapted to control an external device.

Preferably, said server and data storage devices are adapted to initiate predetermined communications to at least one nominated recipient, said communications dependent on signals received from a said individual signalling device.

Preferably, said at least one nominated recipient is a registered user of said monitoring system.

Preferably, said at least one nominated recipient is a service provider to said monitoring system.

Preferably, a said registered user of said monitoring system is enabled to register a said individual signalling device with said central control facility over the Internet.

Preferably, registration of said individual signalling device includes provision of data relevant to responses to external sensor events by said individual signalling device and by said central control facility.

In a further broad form of the invention there is provided a method for monitoring the status of at least one aspect of geographically disparate items of infrastructure; said method including the steps of
- (a) installing an individual signalling device at each of said items of infrastructure,
- (b) providing said individual signalling device with at least one external event sensor and a signal transceiver,
- (c) linking said individual signalling device with a central control facility via a satellite link,
- (d) providing said central control facility with server and data storage devices; said devices adapted to execute pre-programmed responses to a signal received from a said individual signalling device.

Preferably, each said individual signalling device includes:
- (e) a transceiver module,
- (f) a rechargeable power Supply and power control module,
- (g) a logic circuit,
- (h) at least one external event sensor.

Preferably, said method includes the further steps of:
- (a) providing each said individual signalling device with a unique signalling device identification code,
- (b) associating a unique sequence of repeat transmission of said identification code for each said external event sensor,
- (c) programming said individual signalling device to transmit a signal comprising said unique sequence of repeat transmission identification code of said signalling device to said central control facility on the occurrence of a change of said status of a said item of infrastructure,
- (d) executing said pre-programmed responses to a signal received from a said individual signalling device.

In still another broad form of the invention, there is provided, an individual signal unit; each said individual signal unit including:
- (a) a transceiver module,
- (b) a rechargeable power supply and power control module,
- (c) a logic circuit,
- (d) at least one of a number of selectable external event sensors,
- and wherein a signal from a said individual signal unit to a central control facility causes said central control facility to execute a number of predefined steps; said predefined steps configured by an owner of said individual signal unit.

In still another broad form of the invention, there is provided a monitoring system including an individual signal unit, said individual signal unit communicating with a central control facility when an event sensor activates said individual signal unit, said central control facility executing a number of predefined steps on receipt of a communication from said individual signal unit, said predefined steps configured by an owner or registered user of said individual signal unit.

Preferably, a communication between said individual signal unit and said central control facility is not limited by distance.

Preferably, said individual signal unit may be located at any location relative said central control facility. Preferably, said individual signal unit is mobility independent of said central control facility.

Preferably, said communication between said individual signal unit and said central control facility is by means of any communication network.

Preferably, said predefined steps include a communication between said central control facility and a said owner or registered user of said individual signal unit.

Preferably, said communication between said central control facility and said owner or registered user is by means of any communication network.

Preferably, said predefined steps may include a first layer and a secondary layer of said predefined steps.

Preferably, selected ones of said secondary layer of predefined steps may be executed by said central control facility in accordance with a reply to a said communication between said central control facility and a said owner or registered user.

Preferably, said individual signal unit is programmable.

Preferably, said individual signal unit includes a graphic display.

Preferably, said individual signal unit is configurable to accept signal input from any external sensing device.

Preferably, said individual signal unit is configurable to allow output signals to any said communication network.

Preferably, said individual signal unit is adapted for integration into products as an original equipment manufacture (OEM) module.

Preferably, said central control facility includes a database and a server, said central control facility maintaining an Internet web site on said server.

Preferably, said system provides a means of asset monitoring; said asset monitoring alerting a said owner or registered user to an incident affecting a said asset.

Preferably, said predefined steps include activation of an output device connected to a said individual signal unit.

In another broad form of the invention, there is provided a method of deriving revenue from a monitoring system; said monitoring system including a remotely located individual signal unit in communication with a central control facility; said method including:
- (a) selling said individual signal units
- (b) renting said individual signal units
- (c) charging periodic registration fees
- (d) charging for network services
- (e) charging for development, programming and design
- (f) charging license fees for custom or retrofitted applications
- (g) collecting industry co-operation commissions
- (h) charging license fees for monitoring agents and service providers.

BRIEF DESCRIPTION OF DRAWINGS

Embodiments of the present invention will now be described with reference to the accompanying drawings wherein:

FIGS. 13 to 16 are further pages of the web site of FIGS. 6 to 12, for configuring of an individual signal unit, FIGS. 17 to 19 are further pages of the web site adapted to allow an owner or authorized person to access data collected by an individual signal unit, FIGS. 21 to 23 show a variety of applications and functions of an ISU installed in a vehicle, including the interfacing of the ISU with the onboard computer of the vehicle, FIGS. 24 and 25 show two pages of a possible web site for registering aspects of a vehicle's performance monitoring and servicing arrangements, FIG. 26 shows the interactions facilitated by means of an in-vehicle ISU for arranging servicing of the vehicle, FIG. 27 shows a web page provided by a central control facility for registration of vehicle service providers who are willing to provide services to vehicles equipped with an ISU, and FIG. 28 shows an example of revenue streams which may be derived from vehicle service providers who register with the central control facility.

DETAILED DESCRIPTION OF PREFERRED EMBODIMENTS

First Preferred Embodiment

Figure 1:
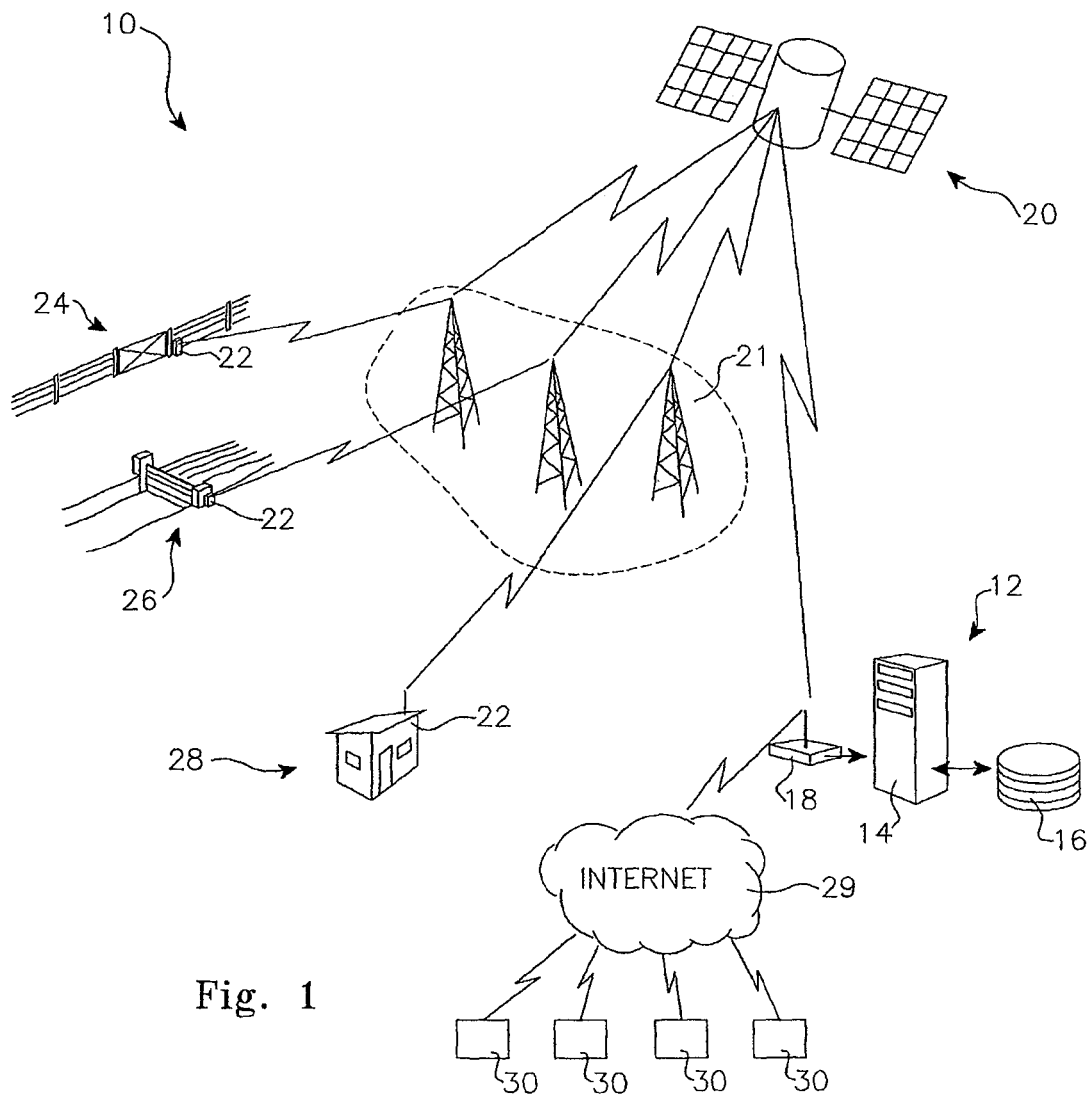
FIG. 1, is a representation of a preferred arrangement of communication between apparatus and users of a monitoring system according to the invention.

FIG. 1 is a diagrammatic representation of the apparatus and connections included in a monitoring system 10 according to a preferred embodiment of the invention. A central control facility 12 includes a data processing server 14 and data storage 16, linked to a transceiver 18. Central control facility 12 is in radio communication with a communication network such as a mobile phone network, or for example as shown in FIG. 1, with at least one communication satellite 20, by means of transceiver 18.

In the example of a communication satellite 20, it in turn, is in telecommunication contact with a number of individual signal units 22, for example via the Global System for Mobile Communications (GSM), the General Packet Radio Service (GPRS) or a similar communication network 21. Individual signal units 22 belong to registered users of the system and may be located anywhere within the signal footprint of a communication satellite (or satellites) 20, or of some other communication network.

Figure 3:
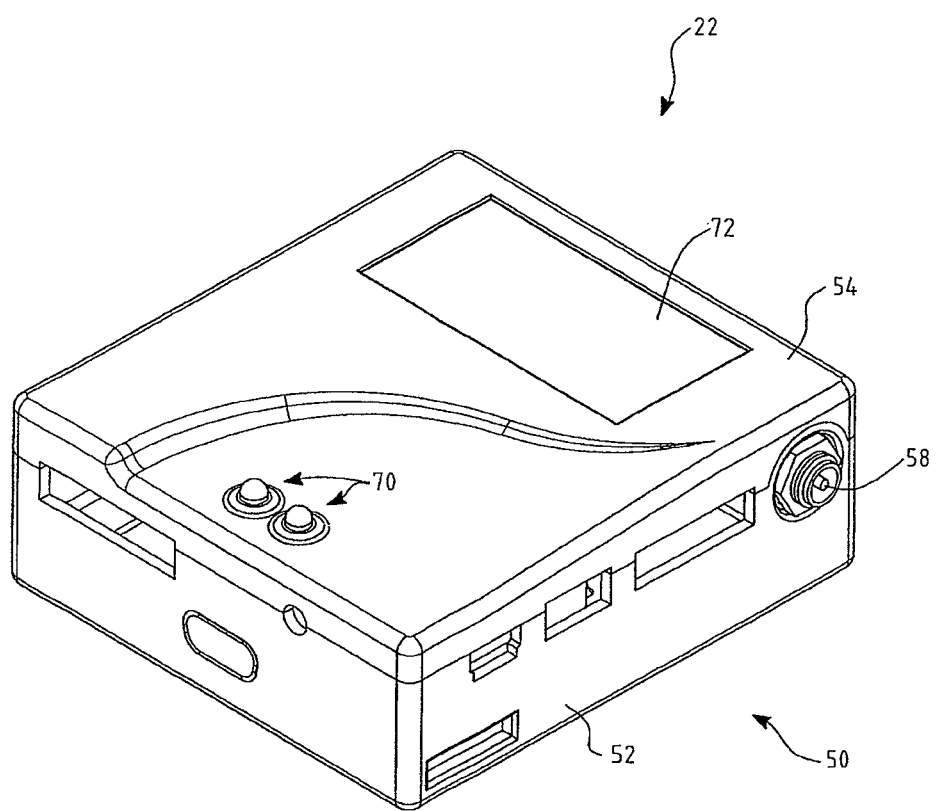
FIG. 3 is a perspective view of a preferred enclosure for an individual signal unit according to the invention.

Individual signal units 22 each are assigned a unique identifying code, and may take a number of physical configurations depending on the environment in which they are to be located. FIG. 3 shows one preferred form of an individual signal unit, comprising enclosure 50 with various input and output devices. In some preferred forms at least, they will comprise a rugged, moisture and tamper-proof outer casing with internal power Supply and a selection of bracketry and other attachment means for affixing the devices to a variety of structures and surfaces. In other preferred forms the device may be incorporated in an item of equipment at manufacture, for example in the lantern structure of street lights.

Figure 4:
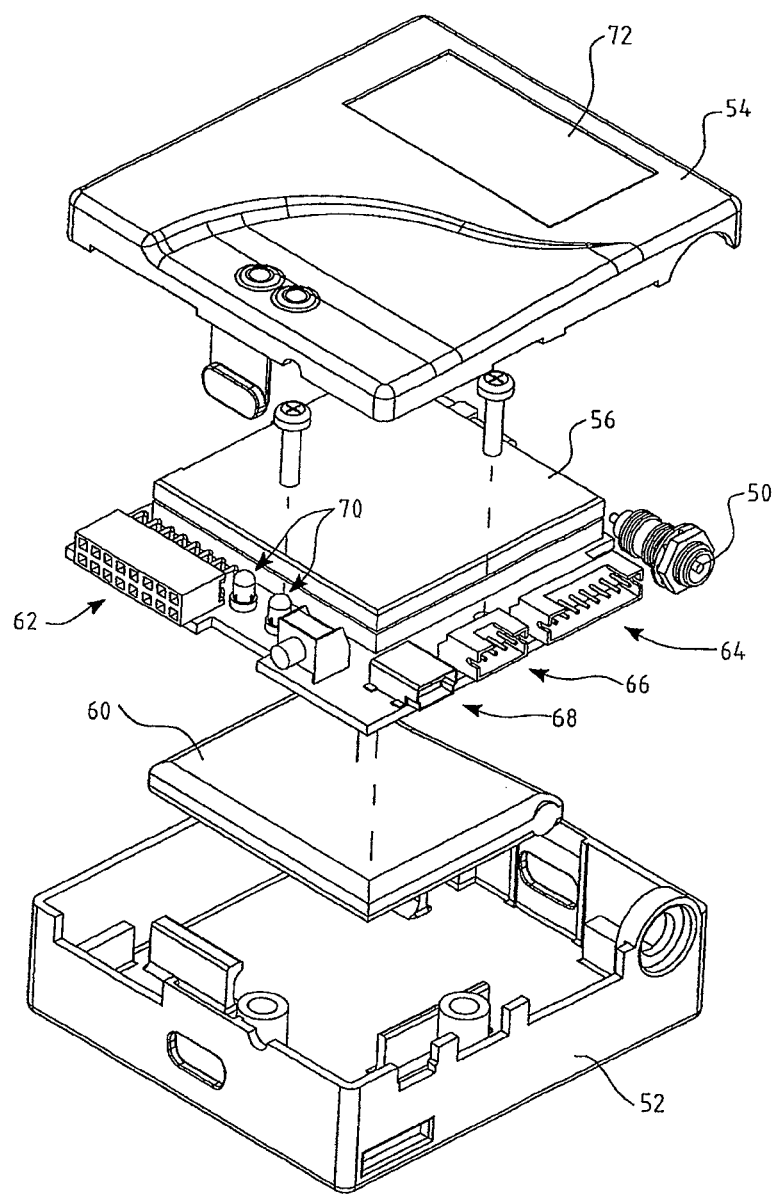
FIG. 4 is an exploded perspective view of the enclosure of FIG. 3 showing principle internal components of one embodiment of an individual signal unit.

With reference to FIG. 4 which shows an exploded view of one preferred form of an individual signal unit 22, enclosure 50 comprises a base portion 52 and cover portion 54. Housed within enclosure 50 are a communication module 56, for example using the General Packet Radio Service (GPRS) standard for communication with a communication network, and antenna jack 58. Also contained within enclosure 50 is a rechargeable battery module 60, and various input and output connections, including power input/outputs 62, sensor inputs 64, device relay connections 66 and a universal serial bus (USB port) 68. Individual signal unit 22 may also be provided with status indicating light emitting diodes (LEDs) 70. Enclosure 50 is provided with a space, for example space 72 on cover 54, for display of a code used in the registration of the unit with the central control facility.

Each individual signal unit 22 is adapted to monitor the status of some aspect of an item of infrastructure, such as for example illustrated in FIG. 1, a gate 22, irrigation control sluice 24 or tool shed 26.

Figure 2:
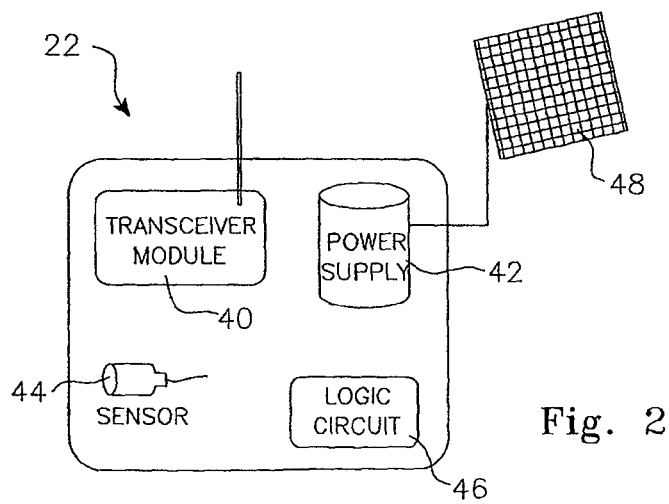
FIG. 2, is a schematic of a preferred embodiment of an individual signal unit (ISU) of the arrangement of FIG. 1.

As shown in the schematic of FIG. 2, individual signal units 22 include at least a transceiver module 40, a rechargeable power Supply and power control module 42, at least one external event sensor 44 and a logic circuit 46. For some applications, an individual signal unit may be provided with, or connected to, a magnetic card reader, enabling inspecting personnel to simply Swipe an authorising card as confirmation that the individual signal unit is in its proper position and functioning, or that some predefined task has been accomplished.

Preferably, the power supply 42 is rechargeable by means of a Solar panel 48, but may also comprise batteries rechargeable from a mains power Source, or replaceable battery packs. Where an individual signal unit has been incorporated in some item of infrastructure already provided with a power Supply, such as in the street light example, power to the unit may be provided from that external Supply.

An individual signal unit 22 may be provided with at least one external event sensor 44 incorporated within the device itself, but individual signal units 22 are more preferably provided with a sensor interface allowing the unit to accept signals from a number of external event sensors connected to the interface. Thus for example, an individual signal unit 22 may monitor a number of aspects of a remotely located facility, Such as the doors and windows of a building or various items of equipment located on a service vehicle.

Figure 5:
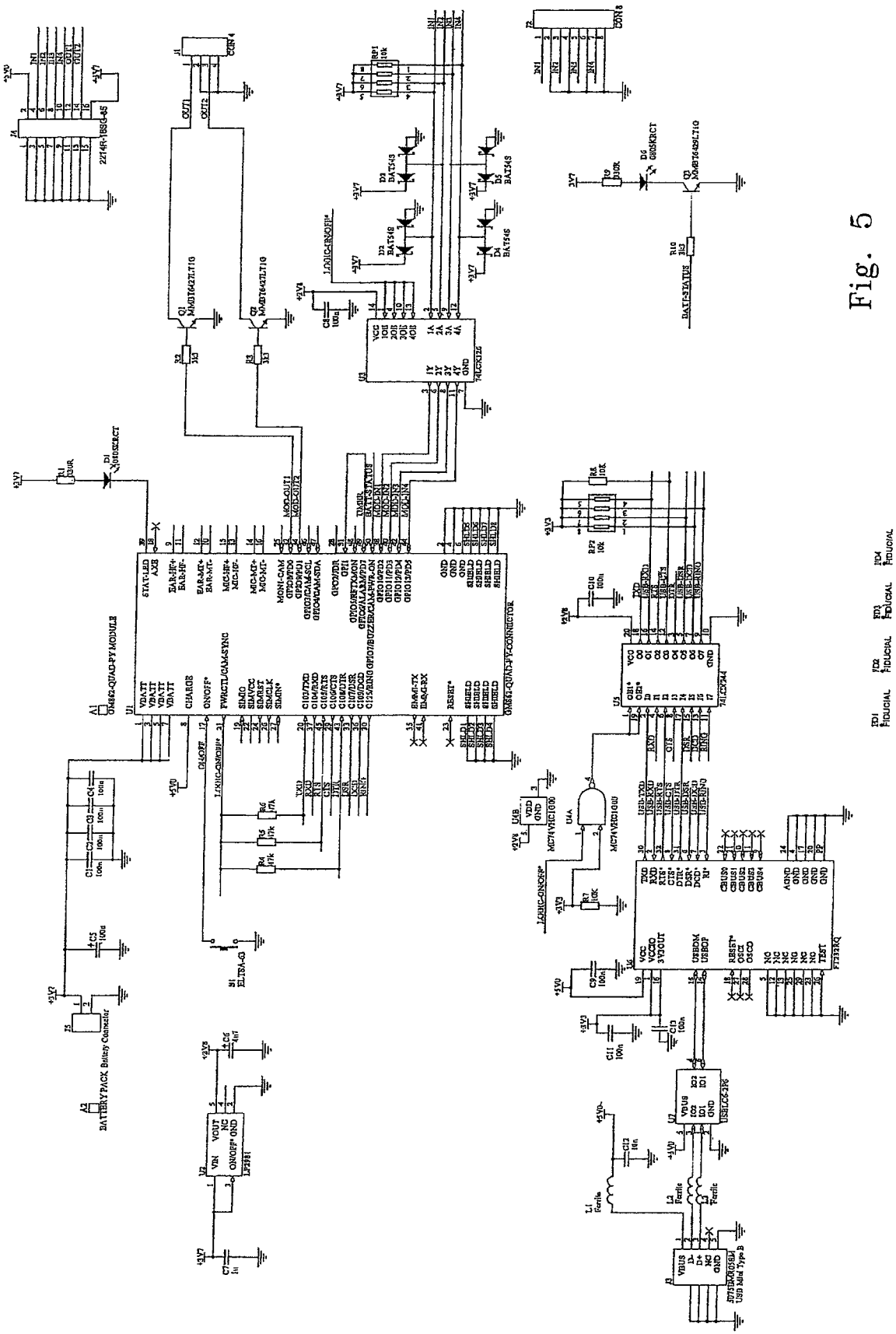
FIG. 5 is a circuit diagram of an embodiment of an individual signal unit.

With reference to FIG. 5, the ISU may include the following components.

GSM Engine 74.

This is the central core of the device. It includes a GSM transceiver allowing the module to connect to and communicate over the GSM network. The transceiver also makes use of the GPRS capability of the GSM network to connect to a server of the central control facility using IP sockets. The GSM engine also includes a basic Python script interpreter to run application scripts (software) and a battery charger 75 to allowing the charging of a LiIon battery pack (connected via J5 on the circuit diagram of FIG. 5).

The application scripts (software) loaded into the GSM engine 74 allow the module to monitor the external sensors and devices connected to the ISU device and generate messages over the GPRS network to the central control facility server whenever there is a change in the status of these external sensors or devices. The typical operation will be for the GSM engine to connect to a known IP socket on a server at a known IP address. The message passed to the server via this connection will include the identification of the ISU device (typically the phone number associated with the SIM card) and the details of the input status change.

The GSM engine has a push button switch (S1 on the circuit diagram of FIG. 5) which allows the GSM engine to be turned on and off.

Network Status Indicator (D1 on Circuit Diagram)

An LED (light emitting diode) is provided to give an indication of the status of the ISU device. When the LED is permanently off, the device is powered down. When the LED is blinking quickly (approximately 1 second period), the GSM engine is searching for the GSM network and attempting to register itself with the network. When the LED is blinking slowly (approximately 3 second period), the GSM engine has registered itself with the GSM network and is in a state that will allow it to make a connection with a server should one of the inputs change state. When the LED is permanently on, there is an active call being made by the device.

Battery Status Indicator (D6 on the Circuit Diagram)

A visible indication of the charge status of the battery is provided using an LED (light emitting diode).

USB Connection (J3 on the Circuit Diagram)

The ISU device has a USB connection to allow the module to be connected to a Personal Computer. This connection allows the application scripts (software) to be updated in the GSM Engine. Power is also drawn from the Personal Computer to recharge the LiIon battery. The power for the USB interface device (U6 on the circuit diagram) is taken from the USB connector. This minimises the current drawn from the LiIon battery to extend the operational time between charges. Interface components (U4 and U5 on the circuit diagram) isolate the connections between the USB device and the GSM engine when either the USB port is disconnected (USB device powered down) or the GSM engine has been turned off.

A protection device (U7 on the circuit diagram) has been included on the USB port to protect the USB device from electrostatic discharge onto the pins of the USB connector.

External Sensor Inputs (IN 1-4 Signals on the Circuit Diagram)

The prototype ISU device implements 4 external sensor inputs. These connections are available on a dedicated input connector (J2 on the circuit diagram) and on the special attachment connector (J4 on the circuit diagram) These inputs have been configured to allow external sensors to simply connect these input signals to a 0 Volt return signal (available on both connectors) using a relay contact closure. This is the typical output from a wide range of sensors.

An interface component (U3 on the circuit diagram) is provided to isolate the input signals from the GSM engine when the GSM engine has been turned off. There are also some protection devices (D2-5 on the circuit diagram) to protect the inputs of the interface component from electrostatic discharge onto the pins of the connectors.

Controlled Outputs (OUT1 and OUT2 Signals on the Circuit Diagram)

The prototype ISU device implements 2 controlled outputs. These outputs allow external devices to be switched by the ISU device. These outputs are implemented using transistors Q1 and Q2.

The connections to external devices can be made either by the dedicated output connector (J1 on the circuit diagram) or the special attachment connector (J4 on the circuit diagram).

Special Attachment Connector (J4 on the Circuit Diagram)

A special attachment connector has been provided on the ISU device to allow it to be plugged into purpose built sensors. These sensors will be engineered to accommodate the ISU device and all of the required connections between the two devices are made through the single attachment connector. This connector supports attachments that are self-powered and are capable of providing current to recharge the battery in the ISU, as well as attachments that do not have their own power supply and require current from the ISU device's battery to operate.

The apparatus of a monitoring system may include a number of standard sensor devices available for purchase along with, or in addition to the individual signal unit 22. Each sensor device is adapted to respond to a predefined stimulus, and may include sensors for power status, smoke detection, motion detection, door or window opening, button press, fluid level, tampering, location via the GPS system and video camera, for example. These standard sensor devices are provided as a simple plug-in to the individual signal unit 22, via one of the input connection 64 or USB port shown in FIG. 4, or other standard interface ports provided on the device.

An individual signal unit 22 may further be provided with internal error monitoring facilities, such as a power Supply failure. Preferably also, individual signal units 22 are equipped with interference sensors to alert the central control facility 12 of tampering by unauthorised persons, or disturbance by animals for example.

Individual signal units 22 in at least one preferred embodiment, are provided with output relays to activate one or more external devices according to pre-programmed responses to sensor monitored events. Examples may include the activation of audio and/or visual alarms, the Switching on of Security lighting, closure of fire doors and so forth.

The power supply and control module 42 is adapted to maintain individual signal unit 22 in a passive, standby state until receiving a signal from an external event sensor. Such a signal initiates a powering up of the device, enabling it to transmit its unique encrypted identifying code to the central control facility. After transmission of this signal the individual signal unit powers down and returns to its passive standby state.

An individual signal unit 20 may also be brought into a powered up state on command from the central control facility 12. This powering up may be for the purpose of re-programming the individual signal unit 22 to install a new response procedure, for example after the installation of a new, or an additional external event sensor, relocation of the unit, or to modify an existing procedure.

Where an individual signal unit 22 is provided with data entry and display facilities, such programming or re-programming of the unit may be performed at the device itself. At the conclusion of Such local data input, the new or modified data is transmitted to the central control facility to update its responses to any signals received from the individual signal unit as required.

Referring again to FIG. 1, during a powered up state, as well as following any pre-programmed procedure for the activation of any local connected devices, individual signal unit 22 will transmit a signal via the network 21 and a satellite 20, reporting the event to the central control facility 12.

In a first simplest preferred form of the invention, a signal sent by an individual signal unit 22 consists solely of its unique encrypted identifying code. No data is sent with this code. The information as to what a receipt of this code by the central control facility means, is stored in the central processing computers of the facility. This information, which is Supplied by and under the control of the registered owner of the individual signal unit, may include instructions as to what actions are to be taken in response to the signal.

Although in this preferred form of the invention, the individual signal unit 22 is only enabled to transmit a single encrypted identifying code, it may do so in various ways to indicate various events. Each external event sensor is associated with a unique sequence of repeat transmissions of said unique identification code. For example if an external sensor device is activated, the code may be transmitted a predetermined number of times for that particular sensor at short intervals. However should an error condition develop in the device itself, such as for example a low battery situation, the code may be transmitted singly. The manner of transmission of this single encrypted code is then the determinant of the status of the device and of what action should be taken by the central control facility.

According to its pre-programmed instructions, an individual signal unit 22 may continue to transmit its signal at intervals for a pre-defined period as an aid in location of the device by service personnel alerted by the central control facility 12 as described below.

Again with reference to FIG. 1, a received signal is acted upon by the central control facility 12, notifying any of a number of nominated recipients 30 according to a pre-established protocol negotiated between the registered user of the individual signal unit 22 and the control facility. Notification of details of a monitored event could be made in the form of an email via the Internet 29 as shown in FIG. 1, by facsimile transmission or over the distributed network 21 to any personal communication device.

Typically, one nominated recipient 30 will be the registered user or owner of the individual signal unit from which the alerting signal was received. However nominated recipients may also include service providers, who are automatically notified of the occurrence and the nature of the event, the location of the individual signal unit and any other pre-defined details. Service providers may include police, fire and ambulance services, or equipment servicing personnel for example. At registration of an individual signal unit, the owner of the unit may elect that third parties be contacted only on receipt by the central control facility of authorisation from the owner.

An applicant user or owner will be required to Supply all relevant details of the individual signal unit, its external event sensing faculties, intended location and the procedures to be implemented on receipt of a signal from the device. The central control facility then issues the unique identification code for the individual signal unit. Alternatively, an individual signal unit may be pre-programmed at manufacture with its unique identifying code. As well, the applicant user or owner nominates a service provider of the GSM, GPRS or other communication system, for billing purposes, or alter natively, the central control facility makes this arrangement, with billing for such service included in the overall charge for use of the system.

The information thus received is used by the central control facility to program the procedure to be followed by the facility in response to signals received from the individual signal unit. The facility may also transmit data to the individual signal unit prior to its commissioning but Subsequent to its installation at the infrastructure item, to set the parameters of signal transmission, such as frequency and interval of repeat transmissions for example.

Second Preferred Embodiment

In a second preferred embodiment, the individual signal unit of the present invention again includes at least a transceiver module 40, a rechargeable power Supply and power control module 42, and at least one external event sensor 44 and a logic circuit 46 as shown in FIG. 1. In this embodiment however, the unit may further be provided with a data storage device able to record analogue or digital input from a device connected to the individual signal unit.

In this embodiment also, the unit is not restricted in its transmission to the central control facility of it unique identifying code but is enabled to transmit the input analogue or digital data, either in real time, or retrieved from its data storage device at predetermined times or on command form the central control facility.

Thus in this form, the individual signalling unit may have attached as an input device Such equipment as a video camera, Sound recording equipment or a Global Positioning System (GPS) module for example. The connection of a GPS module allows the individual signal unit to report its location, either continuously, at predetermined intervals or on command from the central control facility. Similarly, a video camera may send images on a continuous basis, at predetermined intervals or as commanded. Alternatively, data from a camera, GPS module etc may be stored in the data storage device (if so provided) of the individual signal unit for later interrogation and download to the central control facility.

In either of the above described preferred embodiments, an individual signal unit may be provided with an on/of facility adapted for local activation. That is a facility whereby a registered user or other authorised person can Switch the unit between power off and standby for monitoring. This facility may be a Radio Frequency (RF) responder unit, either incorporated in the individual signal unit itself, or as a connected input device.

Connectivity

Figure 20A:
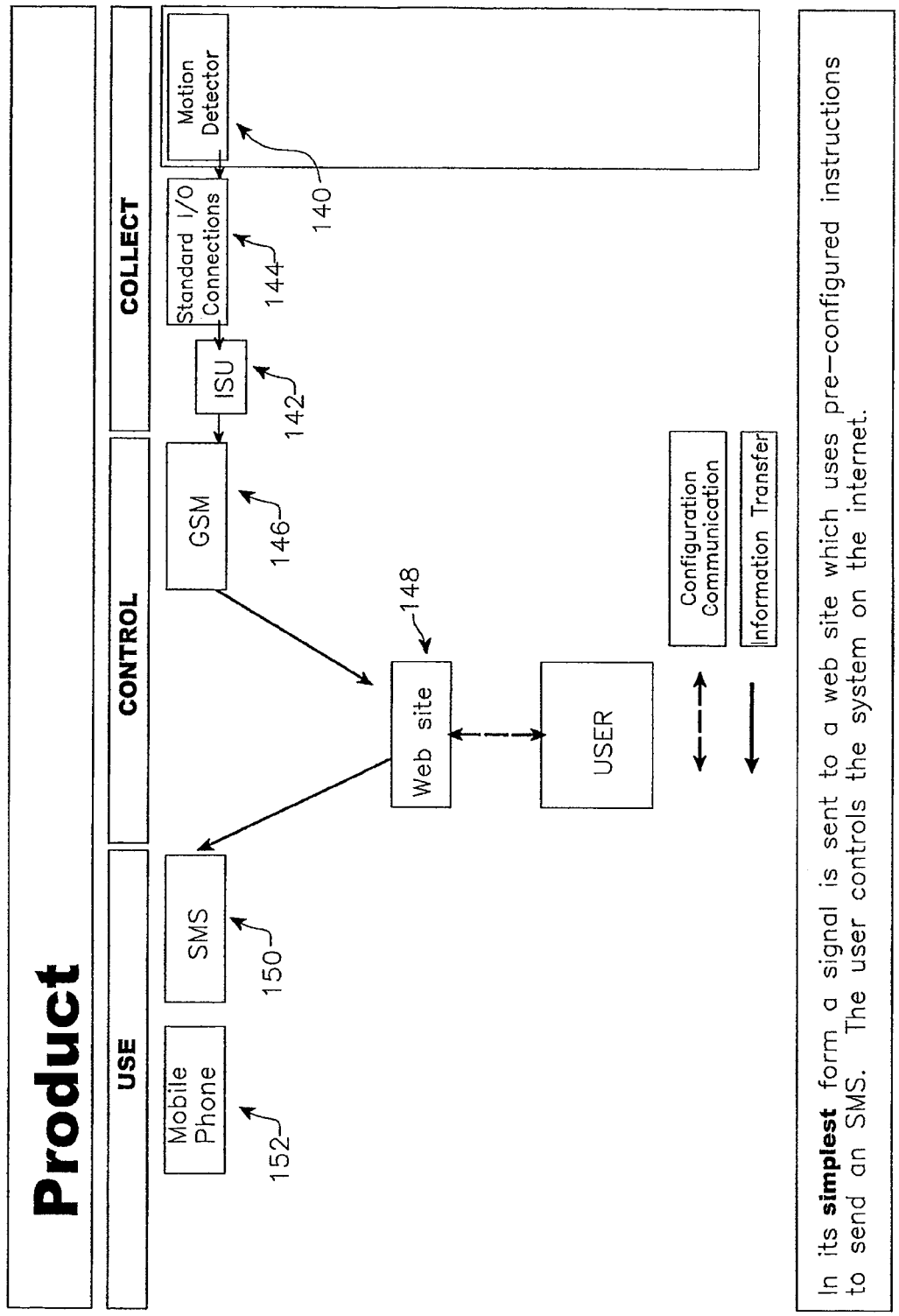
FIGS. 20A to 20H are diagrams indicating examples of the interconnectivity of an individual signal unit (ISU) with a variety of communication systems, input devices, the web site of a central control facility and of that facility's outputs.

The flexibility of the individual signal unit (ISU) in the many ways it can be interfaced with other devices is illustrated in FIGS. 20A to 20D. In its simplest form as illustrated in FIG. 20A, some sensing device, for example a motion detector 140 is connected to an ISU 142 via a standard input/output (I/O) connector 144 provided on the ISU. In this instance the ISU 142 has been configured to send a signal, when activated by input from the motion sensor, via a GSM network 146 to the central control facility (represented in these figures by its web site 148). The web site 148 of the central control facility acts on the received signal according to pre-configured instructions received from the user of the ISU 142. In this example, an SMS message 150 is sent to the user's mobile phone 152.

Figure 20B:
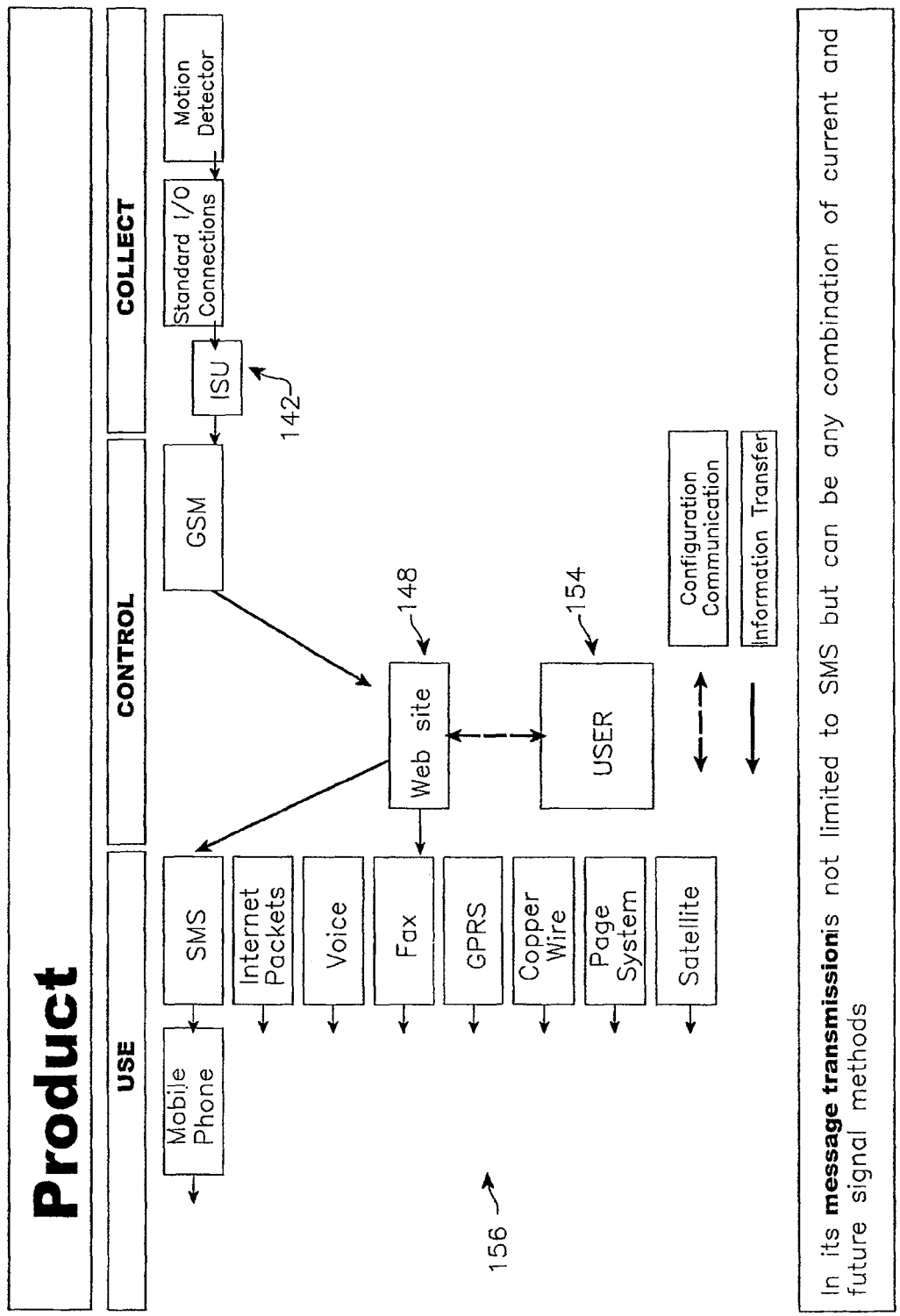

As shown in the sequence illustrated by FIG. 20B, the web site 148 of the central control facility may communicate with the user 154 of the ISU 142 over any one or combination of current or future communication systems 156.

Figure 20C:
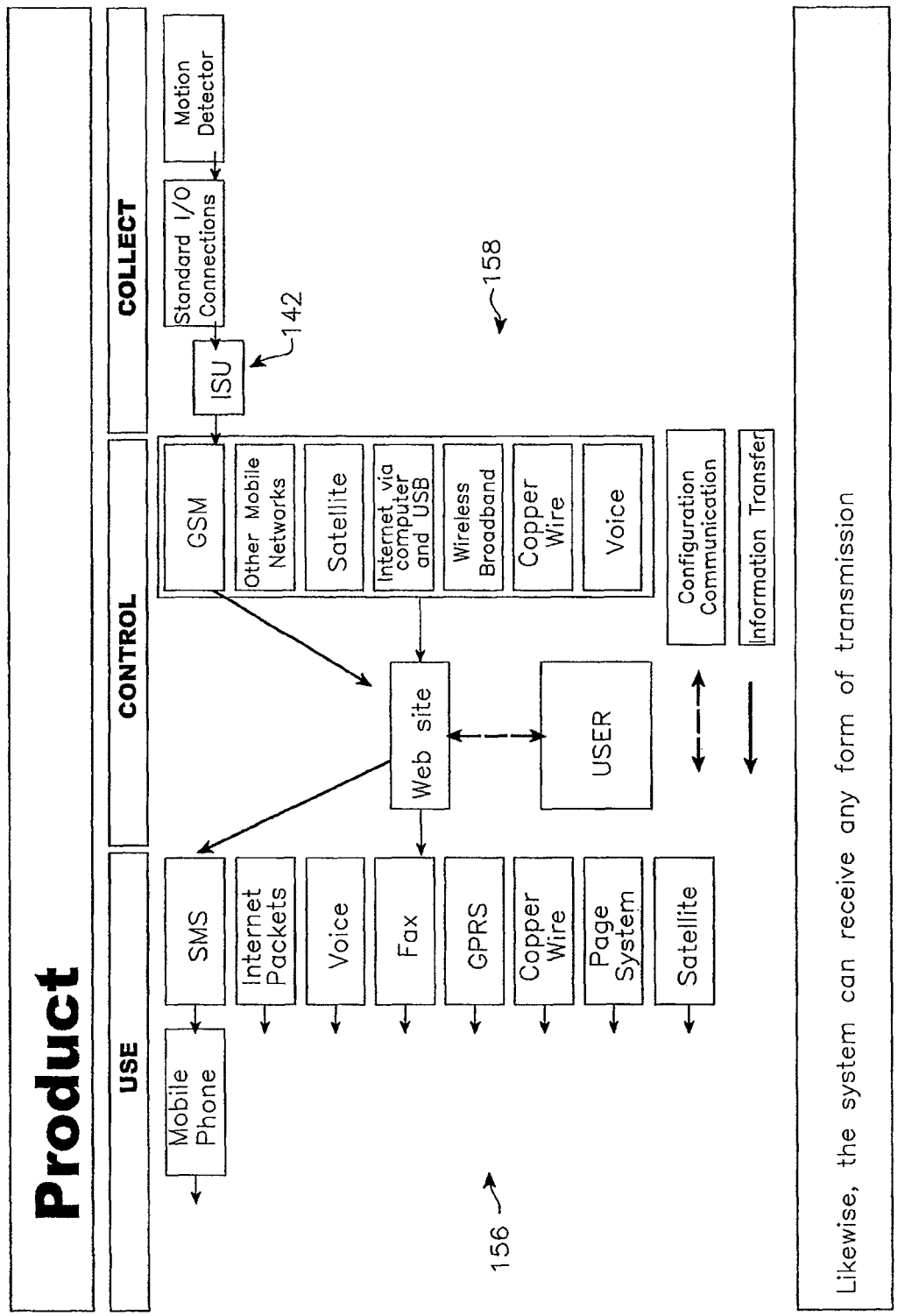
Figure 20D:
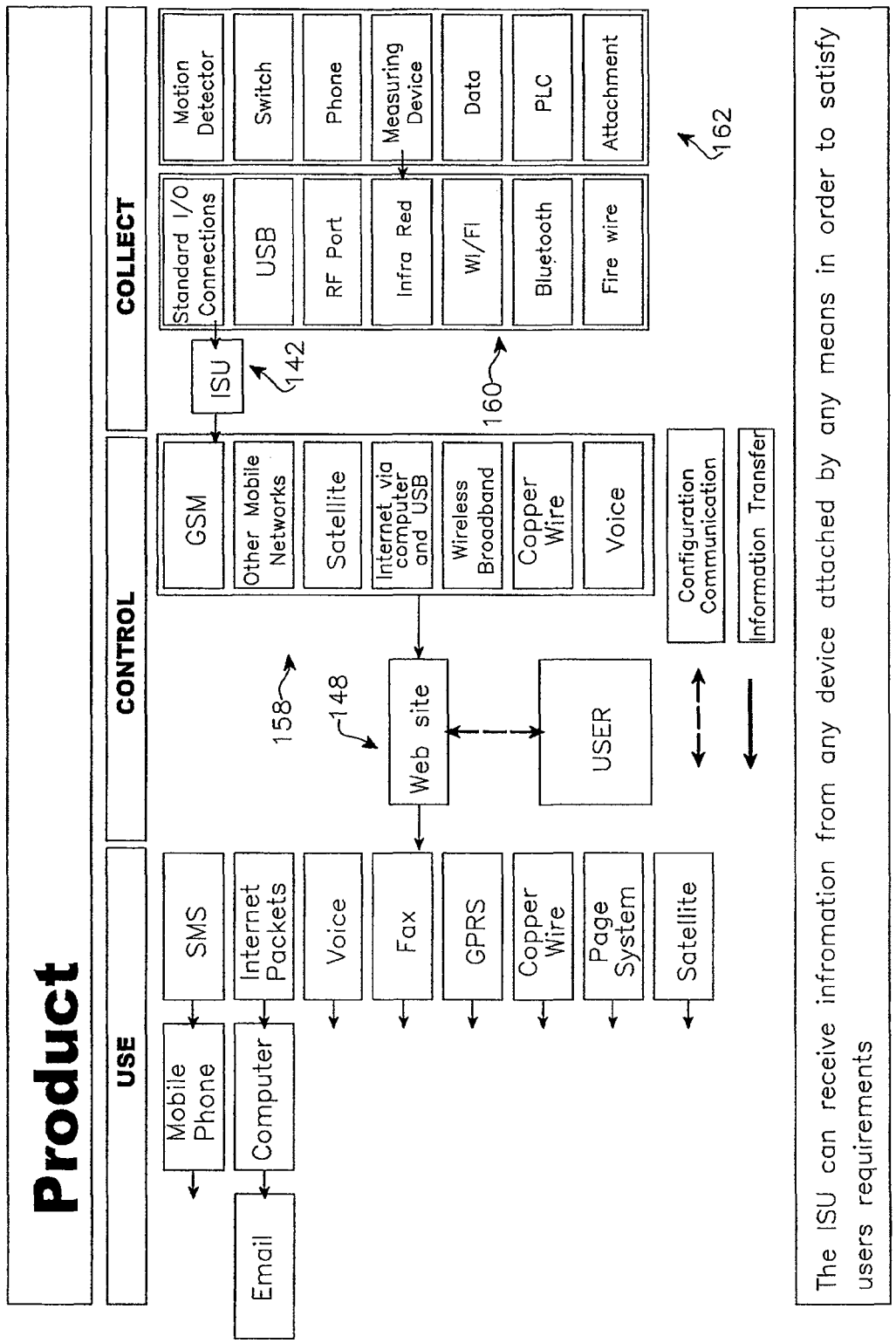
Figure 20E:
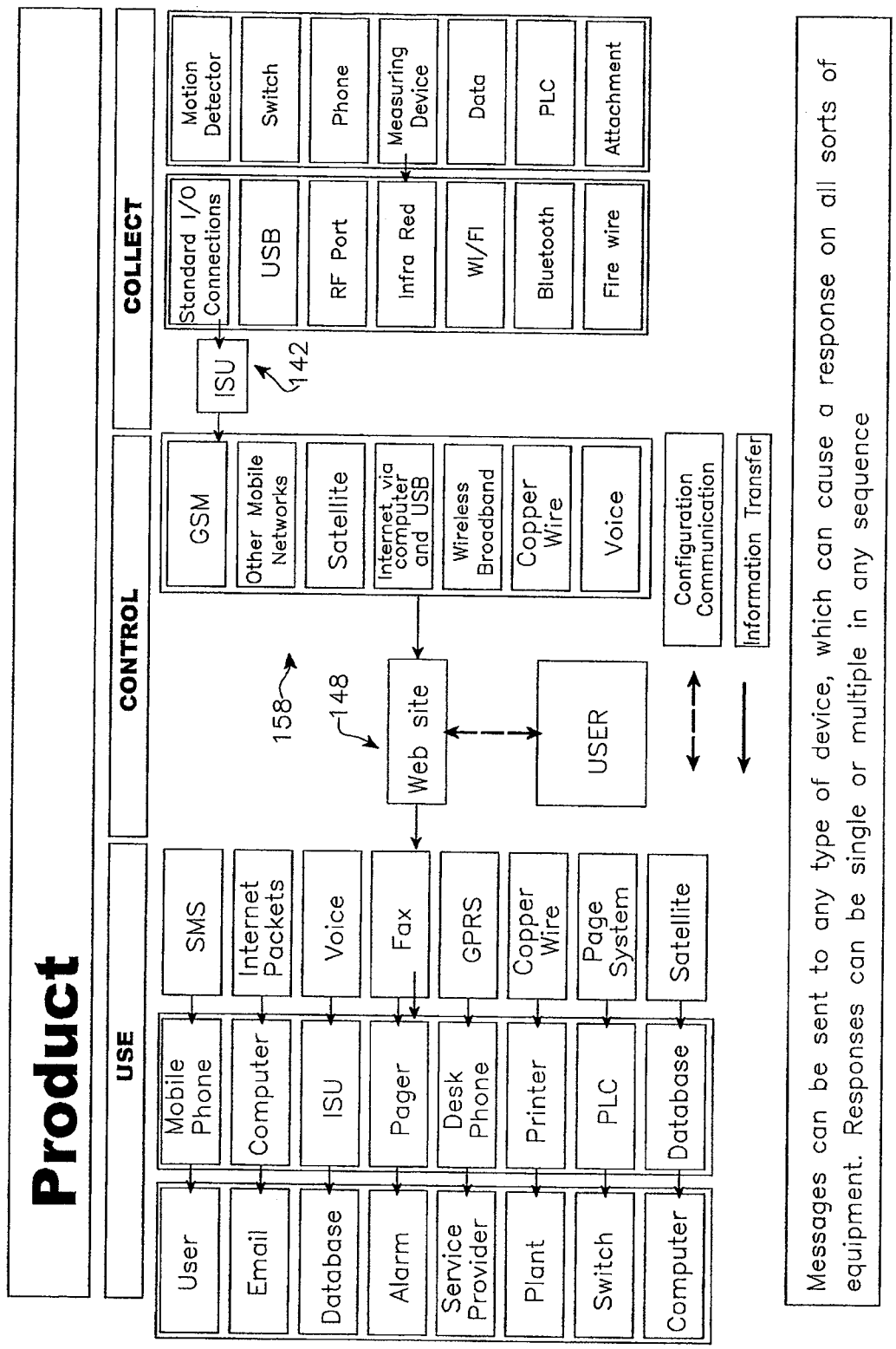

Likewise, as shown in FIG. 20C, the ISU 142 and central control facility may be configured to send and receive a signal from a sensed event via any form of signal transmission, and as further illustrated in FIG. 20E, messages to a user or registered owner of an ISU 142 may be transmitted to any type of communication device.

These may include SMS messaging, Internet, Voice, facsimile transmissions, use of the GPRS system, telephone, pagers and satellite. Thus the central control facility may communicate the occurrence of an incident to the user's mobile phone, computer, land-line telephone, and facsimile machine. As well, the control facility may where appropriate communicate with another ISU. programmable logic controller (PLC) or transfer data to a designated database. Thus, by connecting an output device, for example a PLC, actuator, or motor and the like, to an ISU, the predefined steps or actions to be executed could include the initiation of processes at the remote location at which the ISU is situated.

Also as shown in FIGS. 20D and 20E, the ISU may be configured with a number of standard input/output connectors 160, including but not limited to, USB and RF ports, Infra Red, Wi/Fi, Bluetooth and FireWire receivers for example. Sensors 162 communicating with any one or more of these connectors may include, motion detectors, Switches, telephone, measuring devices, data Sources, programmable logic controllers and other attachments.

Depending on its configurations, the ISU 142 may communicate with the web site 148 of the central control facility by any of a number of distributed communication systems 158. These may include, as shown on FIG. 20E, the GSM or other mobile phone networks, satellite based systems, the Internet, wireless broadband, the copper telephone network and Voice.

Figure 20F:
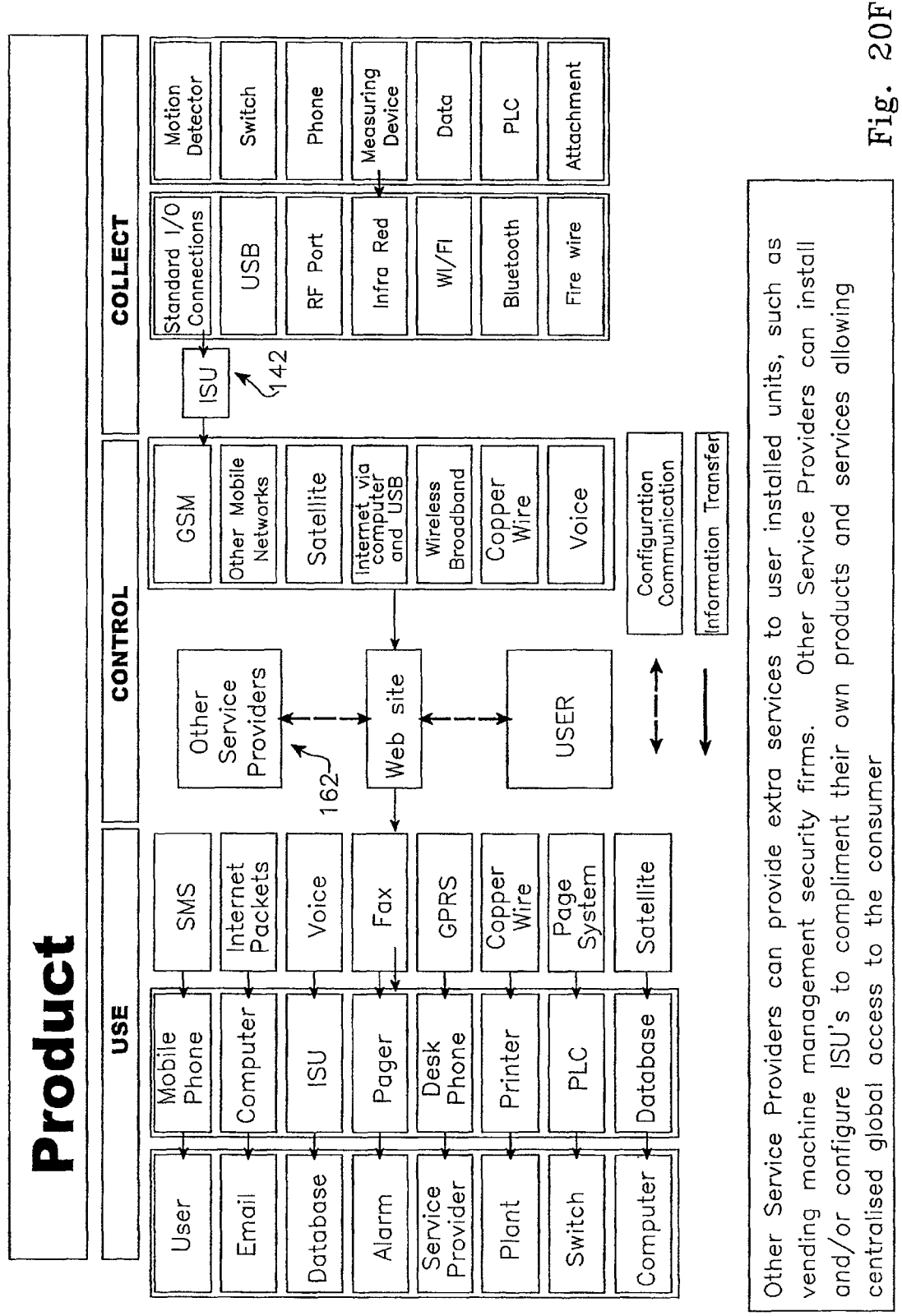
Figure 20G:
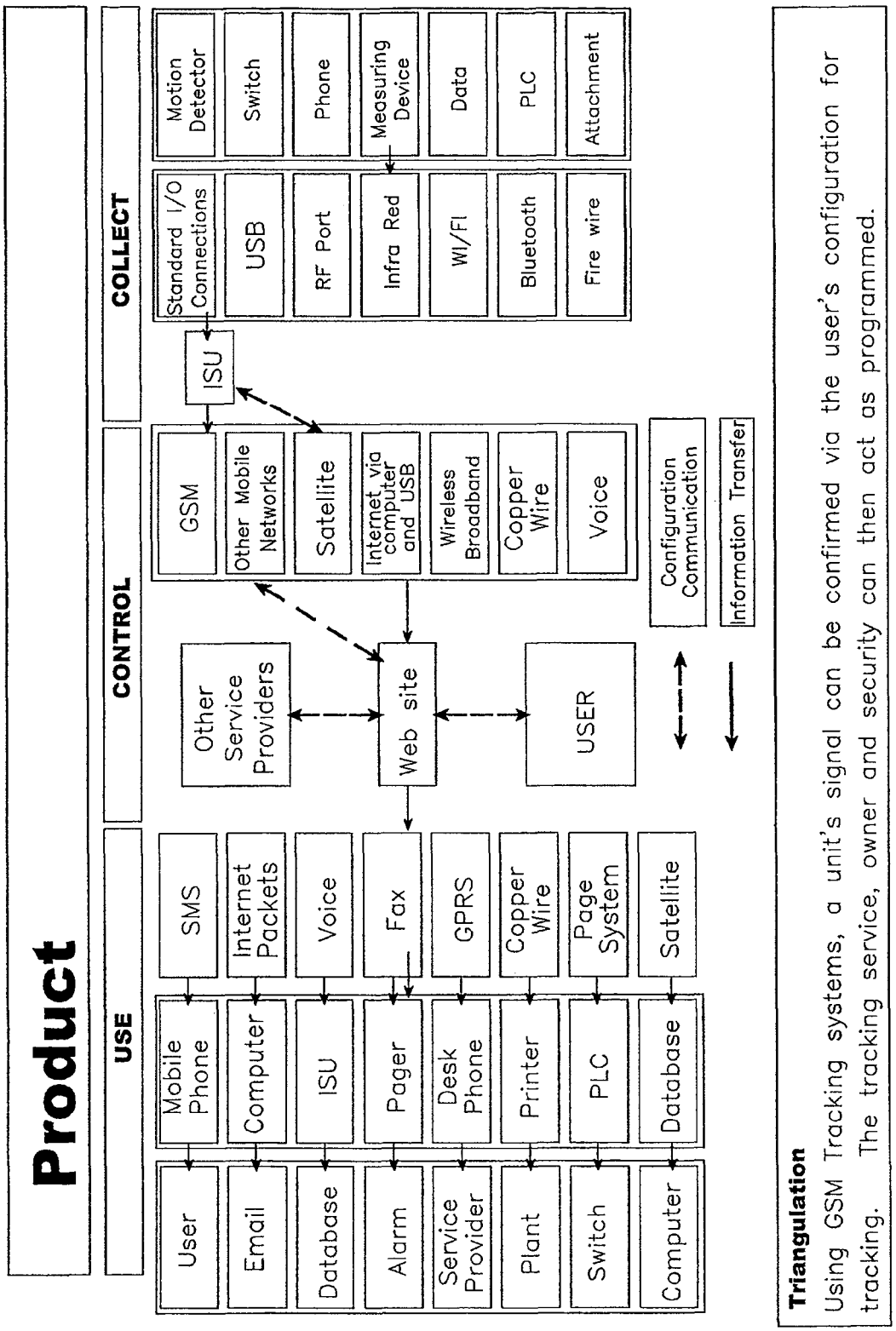

In addition to these communication systems being used to send messages or other forms of communication to the user or registered owner of the ISU, the central control facility may use the same systems for communication with other service providers 162 as shown in FIG. 20F. Using tracking systems available via the GSM network, an ISU's signal can be used to determine its location as indicated schematically in FIG. 20G.

Figure 20H:
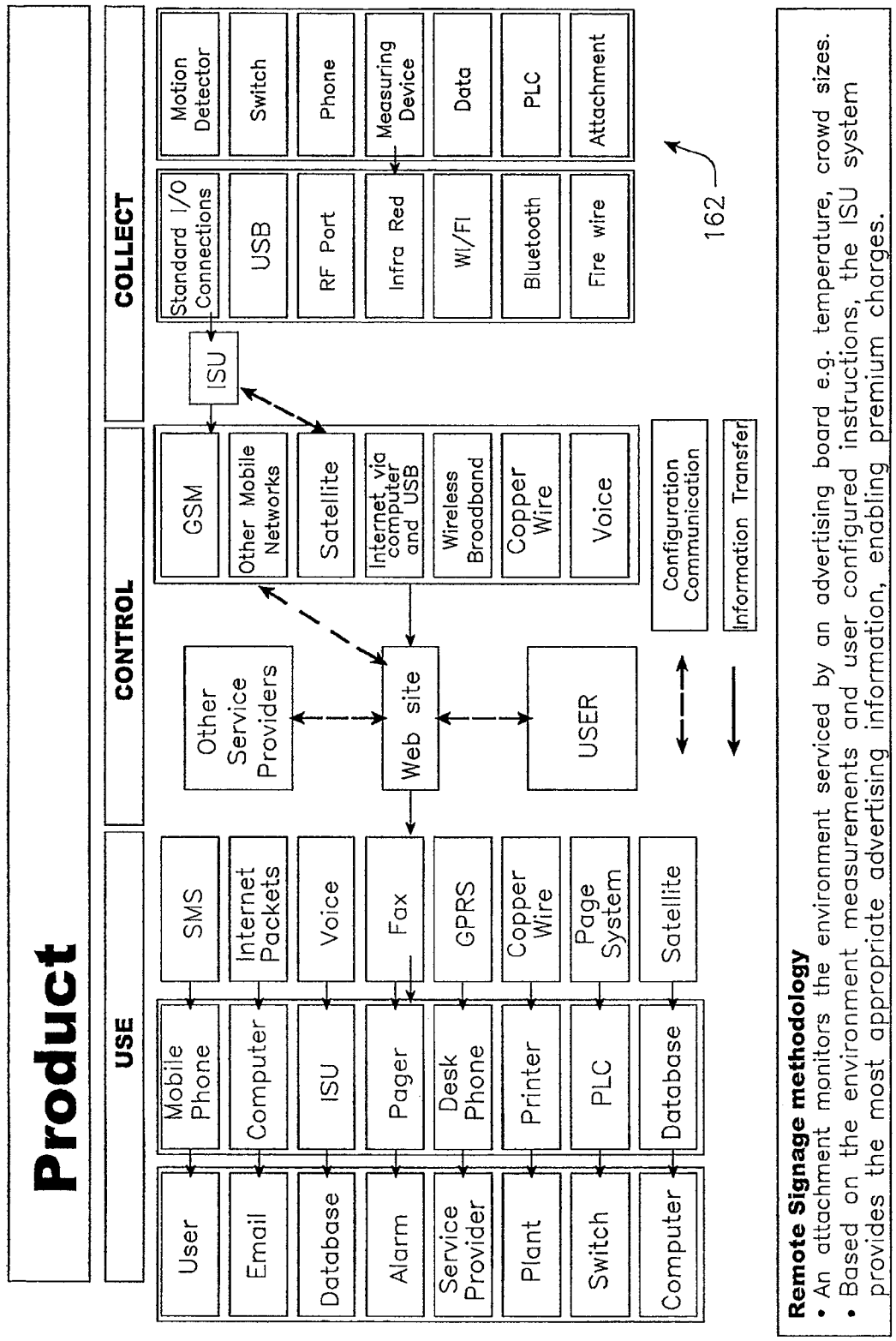

FIG. 20H shows still a further example of how the connectivity of the ISU with sensing equipment may be utilized. Sensors 162 associated with an advertising board may monitor for temperature, crowd sizes or other parameters associated with advertising effectiveness. Based on these measurements and in accordance with the ISU user's configured instructions, the ISU may provide the most appropriate advertising information, thereby enabling premium charges.

Some further features of the monitoring system according to the invention include:
  the ISU and server are programmable and can Support a wide range of inputs.
  The ISU is not restricted to the above described inputs and outputs. Additional or alternative inputs and outputs can be readily added to the design.
  The ISU can Support a variety of transport mechanisms including CDMA, 3G and satellite depending on what distributed communication system is available.
  The message sever of the central control facility is based on scalable architecture allowing it to be duplicated or upgraded to support increased traffic in the future.
  The ISU can support a simple LCD or other graphic display unit, to provide a user with status information.
  The ISU can be integrated into products as an OEM (Original Equipment Manufacturer) module. This may be a user upgradeable or factory fitted option.

The monitoring system of the present invention lends itself to commercial exploitation in a number of ways. Some of these may be Summarized as:
  Licensing of complete systems developed by others as ISU certified
  Retail of ISUs for ad hoc users
  Inviting existing products and services to join user configurable web-based systems
  Additional programming and systems service charges
    Building custom-designed measurement and control applications
  Asset monitoring, for example
    Vehicle care
    Security
    Innovative equipment hire options Triangulation
    Wildlife and stock tracking Scheduling
    Environmental monitoring
  Asset control, for example
    Environmental control—local government, national parks, defence
    Plant control—factories, farms, local government
    Access control—remote door opening Revenue may be derived from a number of activities associated with the ISU based monitoring system, for example:
  Unit sales—ISUs and attachments
  Unit rentals
  Monthly registration fees—ISU network, optional services
  Network services charges (e.g. SMS, GPRS etc) Development programming, design
  Annul license fees for custom or retrofitted applications
  Access to ISU network fees for other service providers
  Industry co-operation commissions (e.g. Insurance rebates
  License fees from monitoring agents (e.g. Callout providers)

With reference now to FIG. 24, with an ISU fitted to a vehicle and interfaced with the vehicle's onboard computer, the vehicle becomes another device for which the registered owner of the ISU can configure various actions associated with aspects of the vehicle. One category of configuration as shown in FIG. 24 is a listing of preferred or potential servicing facilities for the vehicle from which quotation may be solicited for servicing or repair. Performance and satisfaction ratings may be assigned to these facilities garnered from data collected by third party assessors and Supplied to the central control facility.

A further configurable option shown in FIG. 25, is for the owner or manager of the vehicle to receive data of performance parameters of the vehicle.

FIG. 26 shows a possible result of a vehicle management configuration using the ISU in a vehicle to arrange for servicing of the vehicle at a predefined service interval. The ISU, monitoring the vehicle's onboard computer, signals the central control facility that the vehicle has reached the given odometer reading. This activates the central control facility to obtain quotations for service and possible dates at which the service may be accommodated from the three service nominated by the vehicle's owner at registration.

To provide the above service to purchasers of an ISU for an in-vehicle application, the central control facility may establish a database of service providers willing to offer services and provide quotations to registered users of the ISU monitoring system. FIG. 27 shows a web based page service providers may use to register, including the provision of details of any specialised services they may wish to nominate.

This aspect of the application of the monitoring system of the invention provides for a further revenue stream for the central control facility. An example of a pricing structure for vehicle service providers who wish to promote their services to owners of vehicle based ISUs is shown in FIG. 28.

Componentry

As set out in more detail above, the principle components of the ISU are:

Network module
    Processor
    memory
Connectors
Power source

Within these broad component modules, the ISU may be configured in various models with varying attributes:

Network—interchangeable
Connectors—versatility and adaptability focused
Capacity—storage, transmission quantity of data
Durability—weather proofing, water proofing, shock proofing
Power—mains, battery, Solar. Achieving long standby periods of 5 years
Compact size As an example of one possible configuration, an ISU could comprise, a GPRS Module GM862; I/O Connector (J4) 2214R-16SG-85; Light Pipe C435815; LED (alarm and network) 0805KRCT; Switch (On/Off) ELTSA-63; USB Connector 5075BMR05SM; 4 Pin Edge Connectors S4B-PH K-S (output); 8 Pin Edge Connectors S8B-PH-K-S (input); Battery Sanyo UF55344F: Arial Coax 22-SMA-50-0-53.

Attachments

The ISU may be adapted to accept input from virtually any signal producing device. Some currently known examples include: motion detectors, Bluetooth accessories, alarms, detectors and responders.

Other attachable devices include programmable logic controllers, (which may for example be programmed to act on vending machines, dispensers and robots), message boards, remote monitoring devices, RF networks and remote control units.

In Use

Individual signal units 22 are added to the monitoring system 10 by registration with the central control facility 12. Such registration may be accomplished by an applicant user or owner over an Internet web site maintained by the central control facility. Data monitored by an individual signal unit can only be accessed by the registered owner or by third parties authorised by the owner, through use of a user name and password established when a unit is first registered.

The Public User

A new private user of the system may purchase an individual signal unit 22 at any authorised outlet, Such as for example a mobile phone retailer. As well he or she may select from a range of standard sensor units compatible with the individual signal unit also available at the authorised outlet or obtainable from an accredited supplier. Preferably, the individual signal unit is adapted to accept as input up to four individual sensor devices via input connector 64. Thus for example, an individual signal unit may have connected a motion sensor, a video camera, a microphone as well as a smoke alarm (not shown).

Preferably also, the individual signal unit 22 is provided with at least two output relays via output connectors 66, to which may be connected external devices Such as security lights or audio alarm for example.

Figure 6:
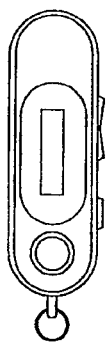
FIGS. 6 to 12 are pages of a possible web site for registering an individual signal unit with a central control facility.
Figure 7:
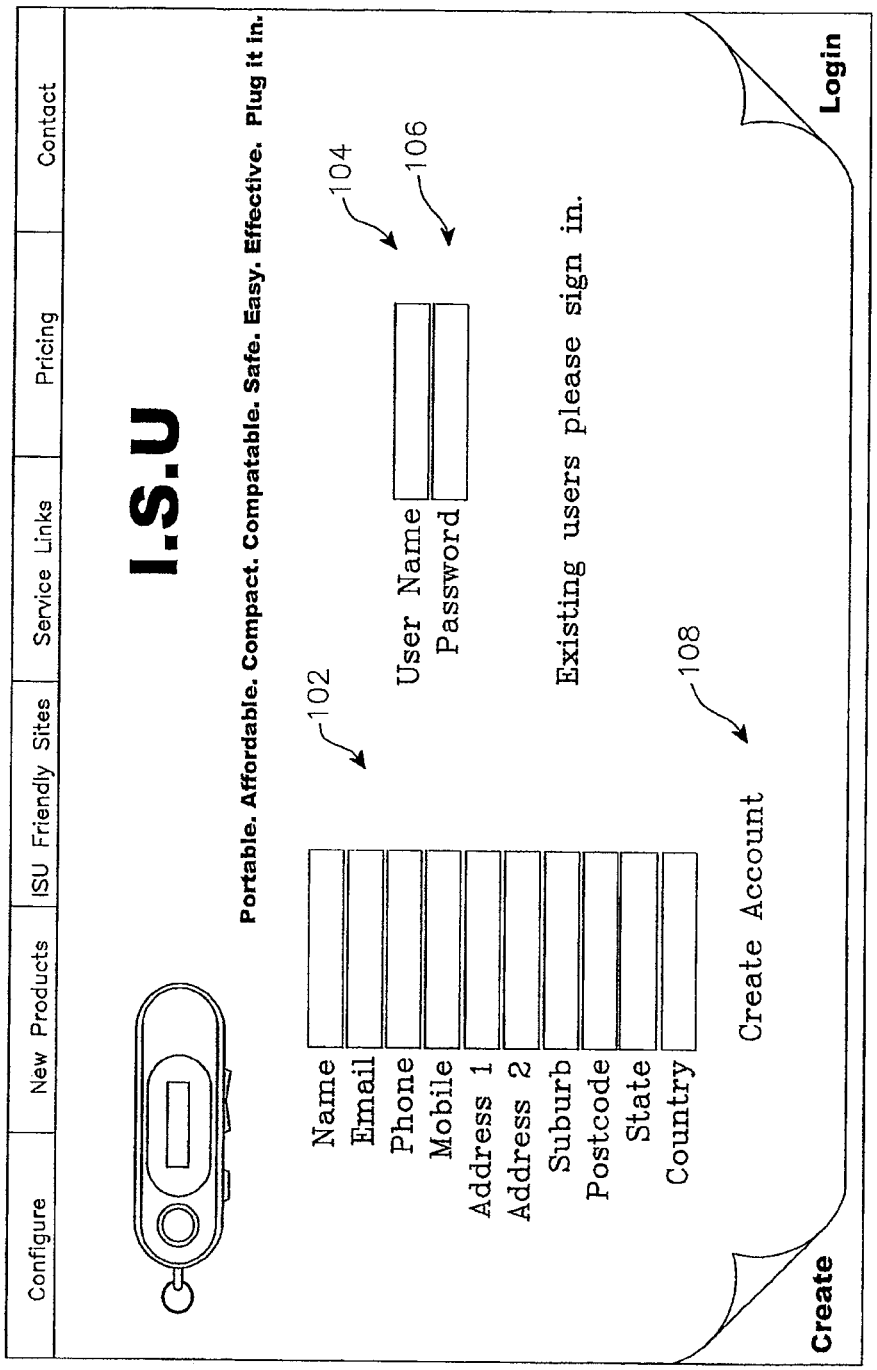
Figure 8:
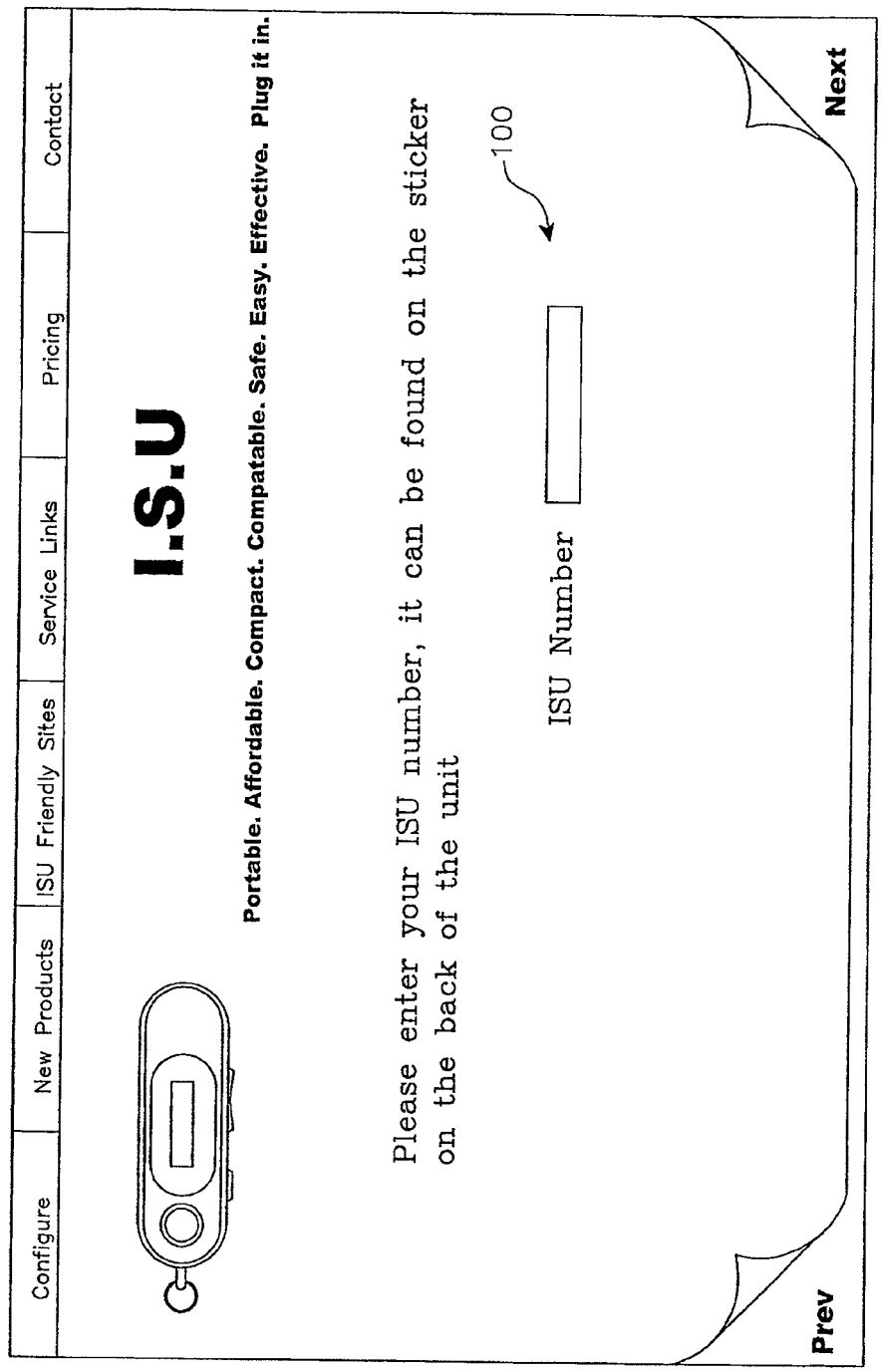
Figure 9:
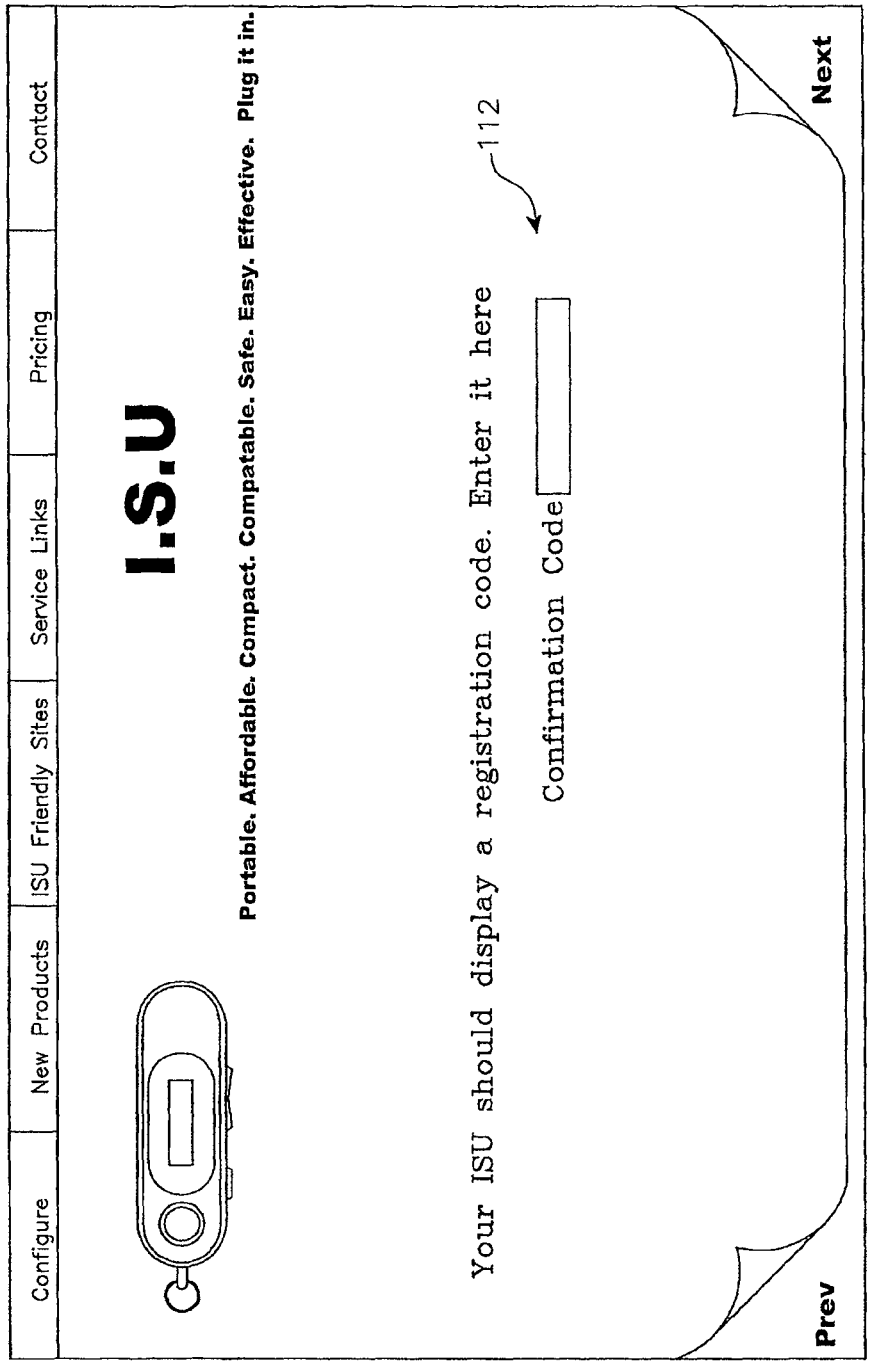
Figure 10:
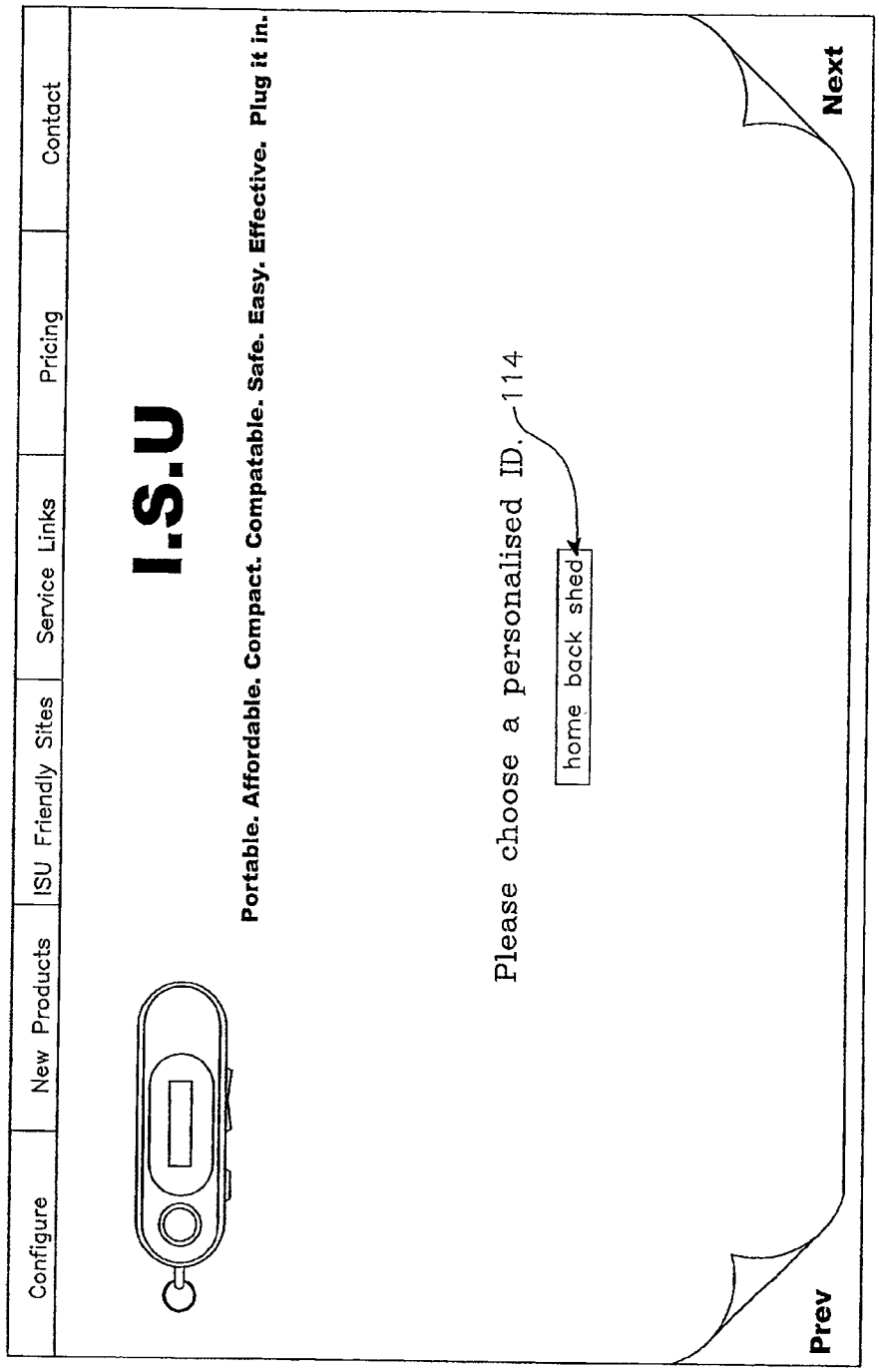
Figure 11:
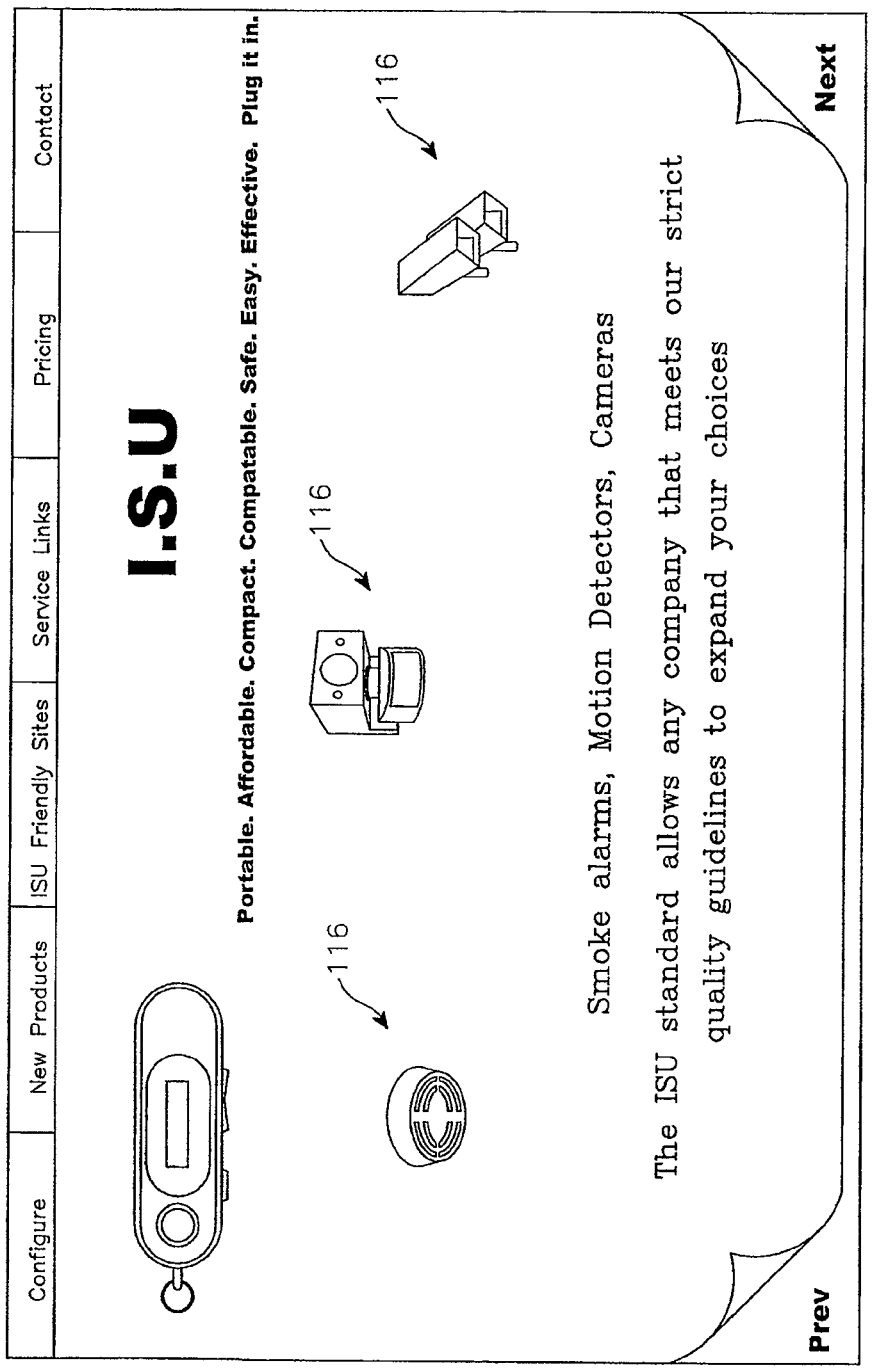
Figure 12:
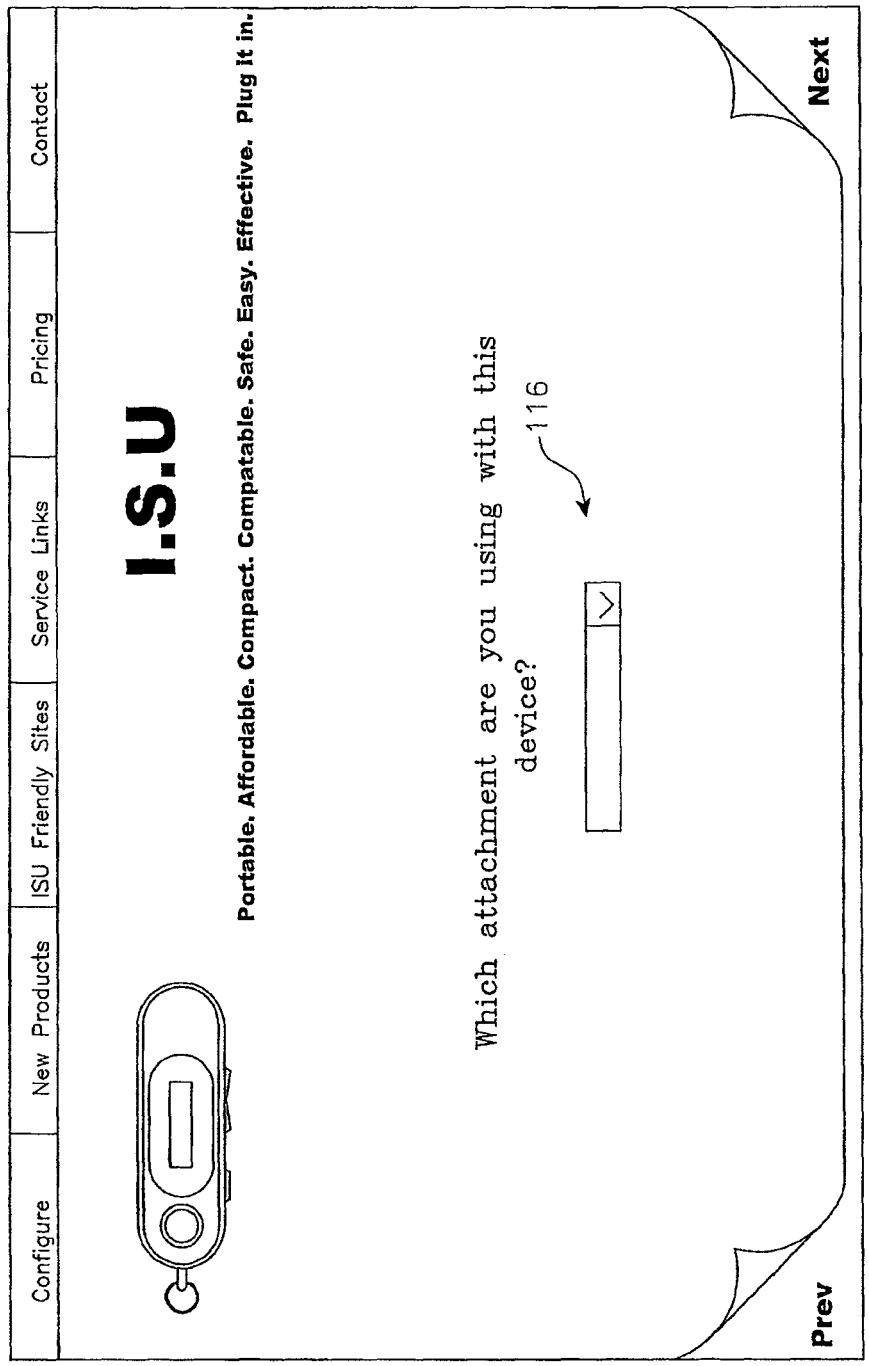
Figure 13:
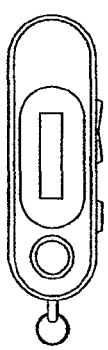
Figure 14:
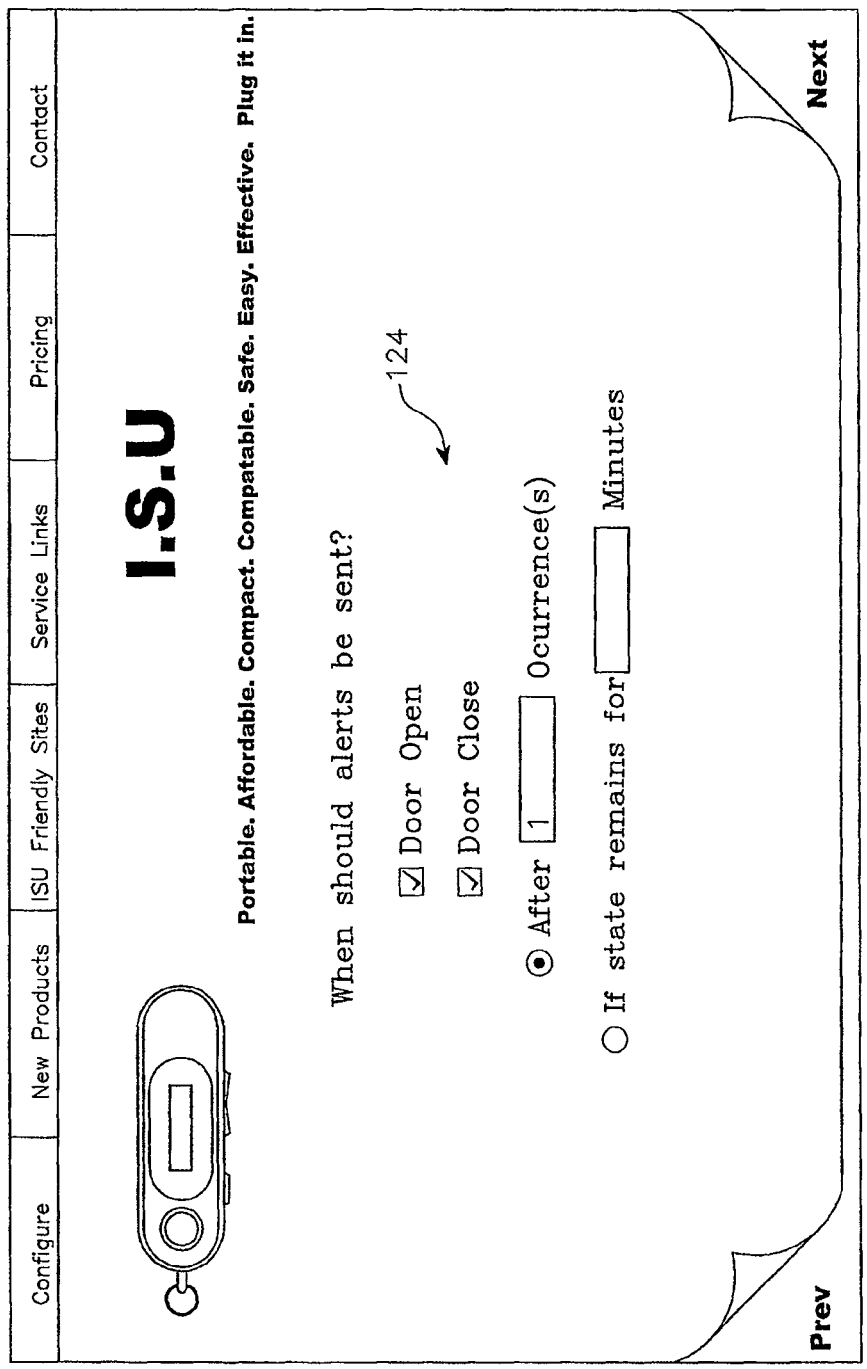
Figure 15:
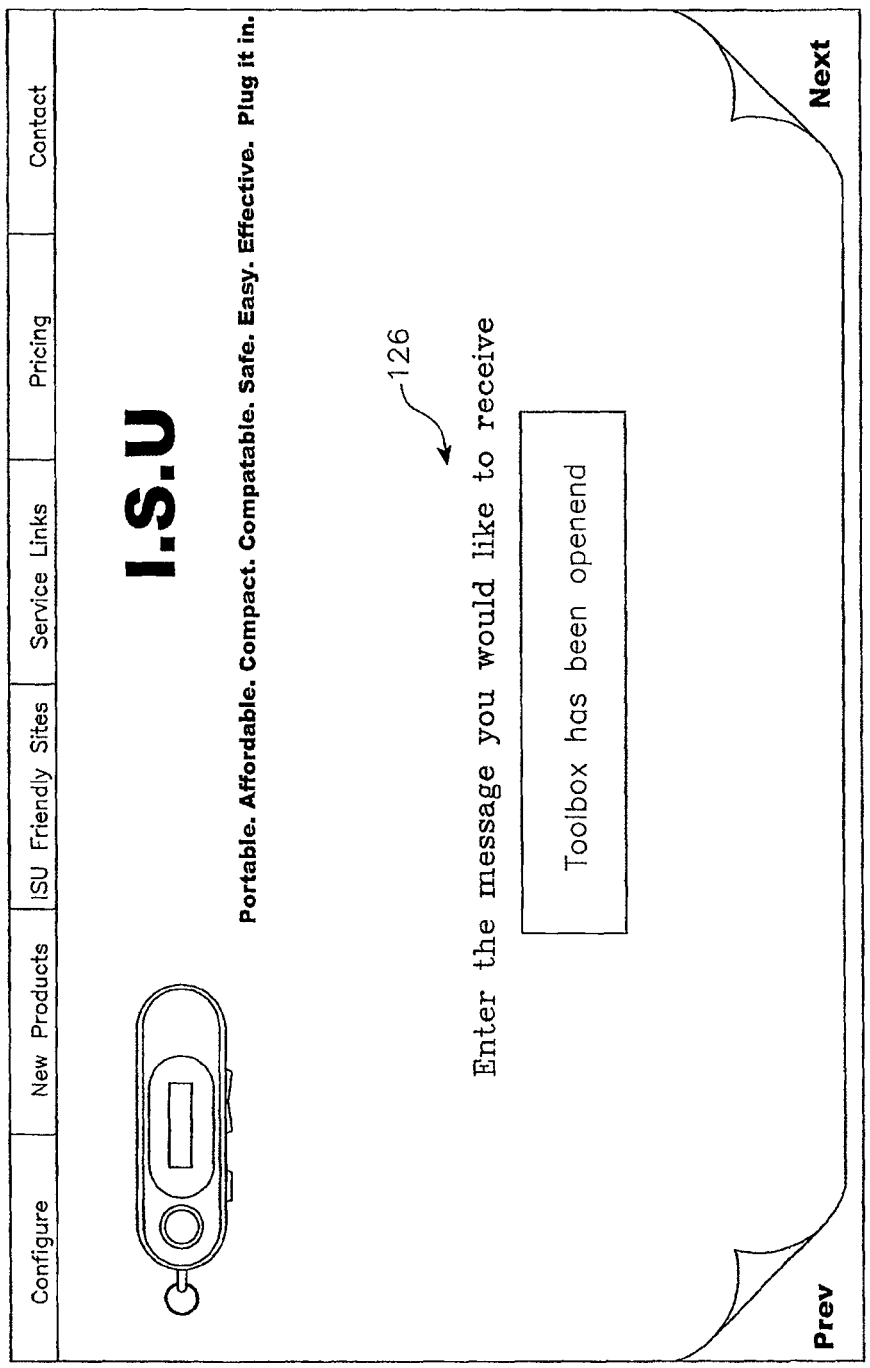

To make use of the equipment, a new owner must register with the central control facility, preferably over an internet web site maintained by the facility, or by telephone. With reference to FIGS. 6 to 12, the process of registration over the facility web site includes the following steps:

1. After logging onto the web site and selecting the option of registering 100 as shown in FIG. 6, the owner enters personal details 102 and selects a user name 104 and password 106 for future interaction with the facility, as shown in FIG. 7.
2. At this point also the owner is required to establish an account with the facility for billing purposes.
3. Next, as shown in FIG. 8, the owner is invited to enter the identification code number 110 of the purchased individual signal unit. This may be provided on the packaging in which the device was purchased or, preferably printed on a removable sticker attached to the device itself (for example in the space 72 on cover portion 54 as shown in FIG. 4).
4. If the device is provided with a display module, a Confirmation Code is displayed when power is provided to the unit, that is when it is first switched on. This number 112 is then also entered as shown in FIG. 9.
5. For ease of identification, the owner may nominate a brief description 114, typically associated with the function or location of the signalling unit and its connected sensor/s, as shown in FIG. 10. For a fixed device, that is one that is not expected to, or which should not move from its installed location, the geographic location may be specified at registration, by means of recording the coordinates from a GPS unit.
6. The owner is then invited to nominate which sensor unit or units are to be connected to the individual signal unit, either by clicking on an icon 116 as shown in FIG. 11, or from a drop-down menu 120 as shown in FIG. 12.
7. When registration formalities have been completed, the owner is given the opportunity to configure the individual signal unit; that is to establish the protocols to be followed by the central control facility in response to a signal transmitted by the device.
8. As shown in FIG. 13, monitoring of the unit may be within specified times 122 or be continuous. Clearly, where for example a device is installed in commercial premises, monitoring for security purposes may only be desired outside working hours.
9. The inputs of the web site page shown in FIG. 14 allow the owner to specify some parameters as to the conditions 124 which must obtain for an alert situation to be reported.
10. As shown in FIG. 15, the owner may then nominate a message 126 which is to be sent to the owner in the case an alert situation arises.
11. The input web site page of FIG. 16 allows the owner to nominate one or more ways 128 in which an alert message is to be sent by the facility. It also allows the owner to nominate a service Supplier, for example a security agency which may be instructed to inspect the site of installation of the individual signal unit. In addition, commands can be specified to activate any external device/s which may be connected to the individual signal unit outputs, such as the Switching on of a security light.

This sequence of steps completes the registration and configuration of the individual signal unit, the attached sensor and any output device/s and the response steps to be taken by the central control facility if a signal from the registered individual signal unit is received.

Figure 17:
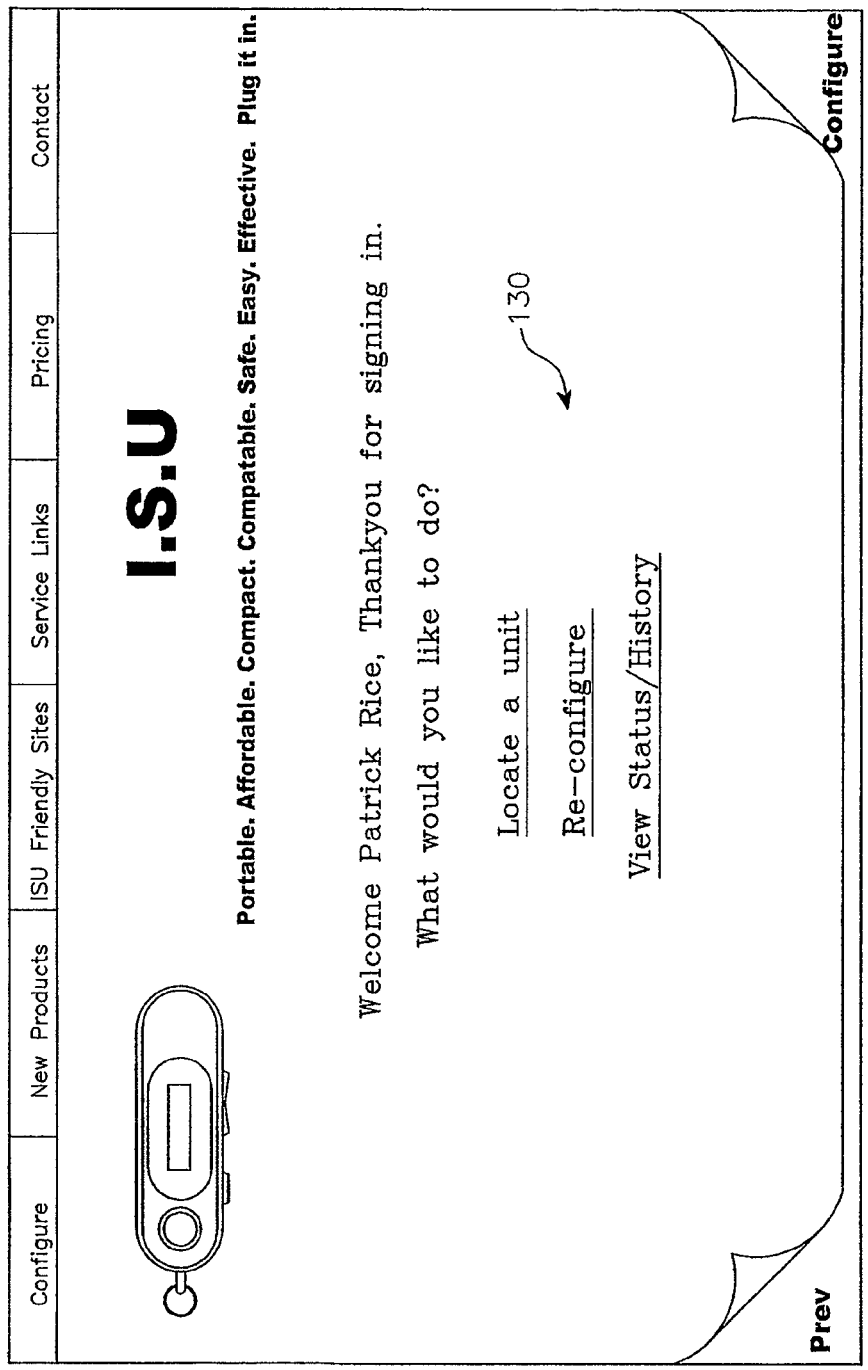

In addition to registration and configuration, the central control facility web site may be accessed at any time by the owner (or other authorised person) of a registered individual signal unit, by entering security user name and password, for example. Several options 130 are then presented to the owner of the individual signal unit as shown in FIG. 17.

Figure 18:
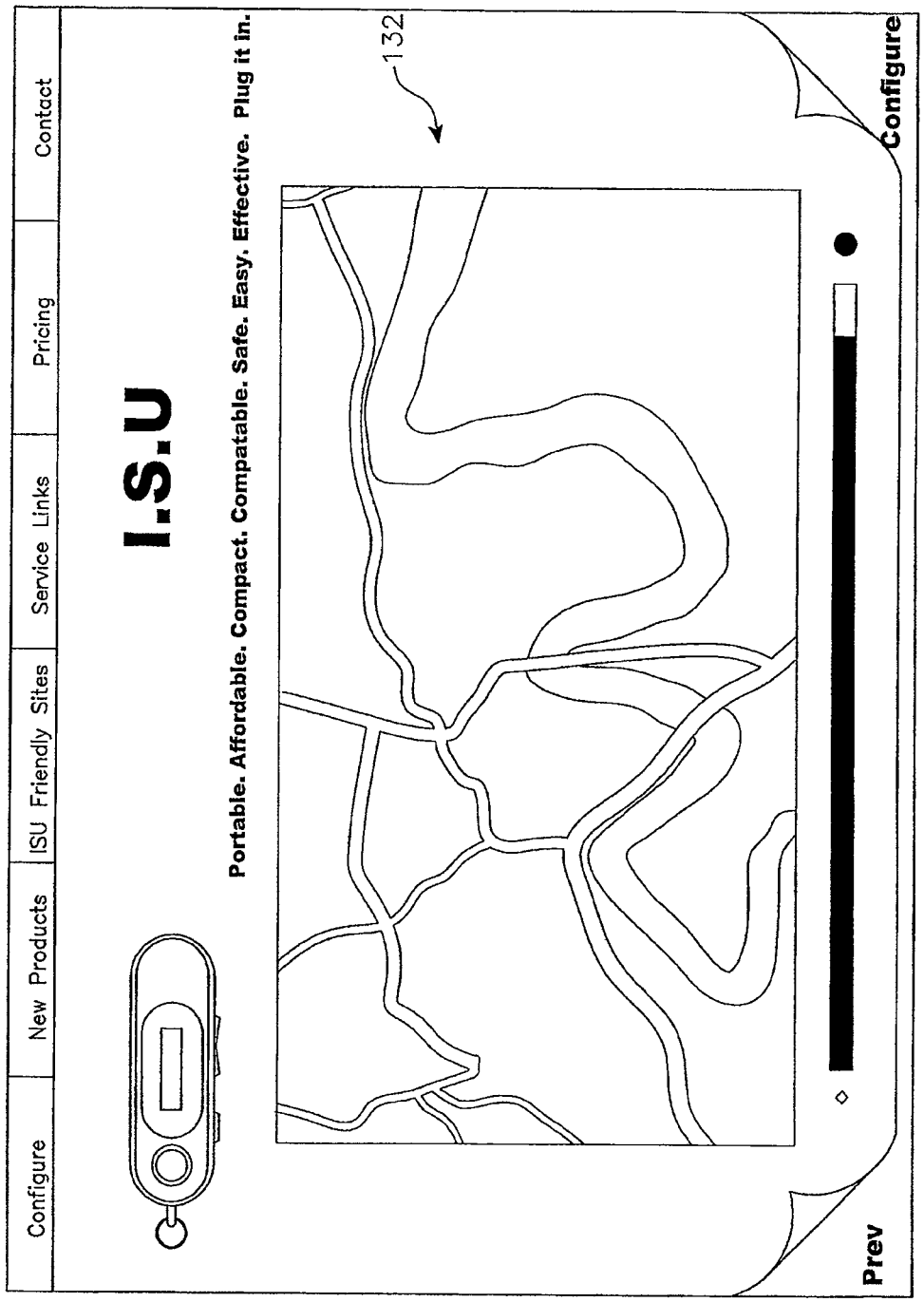

One of the available options is the facility of locating an individual signal unit. When this option is selected, but the individual signal unit is not fitted with a GPS module, the central control facility can command the individual signal unit to transmit its unique identifying code for a sufficient length of time to enable triangulation of its location from three or more stations of the distributed communication network. This location is then Superposed on a map 132 and the map and marked detected location relayed to the owner of the individual signal unit as shown in FIG. 18.

Another option available to a registered owner is the ability to reconfigure the registered individual signal unit. This may be desirable if the device is to be moved to another location, used for a different application, or sensors added or removed from the device for example.

A third option available to the registered owner, is that of checking the current status of the device and its event history. As shown in FIG. 19, this information may be displayed to the owner in tabular form. In the example shown, this owner has four devices 134 registered with the central control facility, and can see at a glance the current status as well as a record of detected incidents reported by each sensing device.

For example "Toolbox 1, may be a toolbox fitted with an individual signal unit, located on an item of earth moving plant left unattended at a work site. The tabulated history shows it has been interfered with at the time and on the date shown 136. Depending on the pre-programmed procedure associated with the individual signal unit, the owner or personnel responsible for the equipment may be alerted within minutes. Alerting messages may be transmitted via any preferred or multiple media, for example by telephone, mobile phone text messages, facsimile or by email.

"Grandma" may be an individual signal unit incorporated in a personal security module in which the sensor is a push button, providing an elderly (or incapacitated) person with a means of alerting someone to a distress situation.

The Commercial User

The individual signal unit of the present invention may be incorporated at manufacture (or be retrofitted) to an item of infrastructure or instrumentation. Individual signal units so incorporated are registered with the central control facility in a similar way to that described for the public user above. In the example given earlier of streetlight fittings, Streetlights under the control of a local authority are fitted, preferably at manufacture, with a sensor and individual signal unit. The individual signal unit for each streetlight is assigned a unique encrypted code which is associated with data maintained in the central control facility's computers. This data may include the type of bulb fitted and the location of the particular streetlight. The data may further include an instruction set as to what action to take when an encrypted code signal is received by the control facility. This could include a message to the maintenance department and even a requisition on a supplier of the required bulb so that a check of bulb stock and possible resupply will automatically follow.

Similarly, smoke alarms may incorporate an individual signal unit, with the smoke detector circuit providing an input to the signalling unit when smoke is detected. In this example power for the signalling unit may be provided in common with the smoke detector power supply. In another example, individual signal units may be incorporated in parking meters, with sensing for example of coin full, out of paper or tampering conditions.

In a further example, as alluded to above, individual signal units provided with magnetic card readers as input attachments may be incorporated or attached at a number of locations within or on the outside of various buildings. Security personnel or cleaners may then swipe an appropriate card through the reader to trigger a signal to the central control facility, which then forwards notification to an appropriate nominated recipient that the building is secure or has been cleaned.

An individual signal unit may be installed in plant and commercial vehicles, monitoring for example power up and power down of an engine so as to track duty cycles, servicing intervals and improper use for example. In this example, the owner of the plant or vehicle can access the central control facility and obtain a record of the times the plant was in operation and log the hours of service.

In yet a further example, individual signal units with appropriate sensors may be located along rivers and streams to give early warning of changes in water levels.

Other areas of use include the monitoring of vending machines as to status of stock and tampering for example. Items of utility infrastructure, such as water and gas supply equipment also may be conveniently monitored for usage and error conditions.

In at least one embodiment of the invention, the action taken by the control facility may be predicated on a secondary layer of instructions received from the owner of the individual signal unit and the sensor or sensors attached to it. For example, the registration of the unit may include a number of optional actions for the control facility to implement after a first notification to the owner (or an authorized recipient designated by the registered owner) of an event.

For example, where the individual signal unit is monitoring the security of a site office or container at a building site, the possible actions to be taken by the central control facility may include:

1. to ignore
2. to call a contracted Security firm
3. to call the site foreman
4. to call a neighbour
5. to call the police The primary instructions on record at the control facility to be followed on receipt of a signal from the individual signal unit installed at the building site, is to send an SMS message to the owner or authorized recipient. He or she may respond for example with "34". The control facility will then carry out actions 3 and 4 of the possible actions of the secondary layer of instructions by notifying the site foreman (3) and the neighbour (4) of the event.

In a further example of use, as summarised in FIGS. 21 to 23, the ISU may be interfaced with the management computer of a private or commercial vehicle. This allows the management of many aspects of the vehicle, its running costs, performance as well as the scheduling of servicing and even the acquisition of service availability and quotations for service.

This application of the ISU is of particular use for operators of hire cars for example with an ISU as described above to provide any of the data transferable from a cars onboard computer. These may include the status of the vehicle's door locks at any given time, for example to indicate if it has been left unlocked while not in use.

In the case of loss of keys of any vehicle, the ISU could be instructed to lock and keep locked the doors of the vehicle until this command was reversed.

An in-vehicle ISU could be used to augment the entertainment system of the vehicle by accessing the internet via wireless broadband for downloading music and videos, accessing a remote computer and using the internet for surfing.

Still with reference to FIG. 22, the addition of suitable devices to the ISU could allow the remote immobilisation of a stolen vehicle, and activate various alarm and indicators that the vehicle is being interfered with.

Information extracted from the vehicle's onboard computer, if relayed to a designated repair centre when the vehicle suffers malfunction at Some remote location, could be used by the repair centre to issue instructions for repairs.

FIG. 23 provides an overview of potential uses of an ISU installed in a vehicle and the actions which may follow on from the monitoring of the status, or measurement of various parameters associated with the vehicle's use and its equipment.

It will be appreciated that the individual signal unit and monitoring system described above provides an extremely flexible and effective way of disseminating an alert of an alarm generated by any of a range of events at widely dispersed locations to owners of the device and/or those service providers best able to deal effectively with the cause of the alarm, and allows a unit owner to specify the circumstances under which the owner is to be contacted actions taken.

The system provides:
Global machine to machine communication
Distance independence Location independence Mobility independence
5 minute DIY installation
An extraordinary number of marketable products.

The individual signal unit (ISU) system of the present invention provides a missing link people products and services.

With unlimited scope and versatility the ISU platform can receive information via any network and initiate a user-configured chain of events, anywhere in the world to any one.

It is capable of bringing world-wide products and services to a centralised system for multiple uses and applications.

The Small compact ISU (similar in size and appearance of a small MP3 player may be adapted to access advanced programming and resources with little or no setup.

The above describes only some embodiments of the present invention and modifications, obvious to those skilled in the art, can be made thereto without departing from the Scope and spirit of the present invention.

What is claimed is:

1. An infrastructure monitoring system, comprising:
a central control facility;
a plurality of geographically disparate individual signaling units each configured to remain in a passive standby state until activated and when activated to communicate wirelessly with the central control facility, wherein each individual signaling unit has a data storage device;
at least one event sensor communicatively coupled to at least one of the individual signaling units and configured to activate the at least one individual signaling unit when the at least one event sensor senses an event, wherein the data storage device for each individual signaling unit records input detected by the at least one event sensor; and
at least one output device communicatively coupled to the at least one individual signaling unit, the system configured to activate the at least one output device via the at least one individual signaling unit responsive to a predefined step taken by the central control facility responsive to the central control facility receiving an identification code from the at least one individual signaling unit upon activation, wherein the identification code includes the recorded input detected by the at least one event sensor and stored in the data storage device of each individual signaling unit.

2. The apparatus of claim 1, wherein the predefined step is determined based on a manner of transmission of the identification code.

3. The apparatus of claim 2, wherein the manner of transmission is characterized by a frequency of transmission.

4. The apparatus of claim 2, wherein the manner of transmission is characterized by an interval of repeated transmissions.

5. The apparatus of claim 2, wherein the manner of transmission is characterized by a unique sequence of repeat transmissions.

6. The apparatus of claim 2, wherein the manner of transmission is characterized by transmitting the identification code a predetermined number of times at short intervals.

7. The apparatus of claim 1, wherein the identification code is encrypted.

8. The apparatus of claim 1, wherein the identification code uniquely identifies an individual signaling unit.

9. The apparatus of claim 8, wherein the unique identification code is encrypted.

10. The apparatus of claim 1, wherein the identification code comprises digital data.

11. The apparatus of claim 10, wherein the digital data comprises information on the event activating the at least one event sensor.

12. The apparatus of claim 1, wherein the at least one individual signal unit is configured to transmit the recorded input at predetermined times.

13. The apparatus of claim 1, wherein the central control facility is configured to retrieve the recorded input on command.

14. The apparatus of claim 1, wherein each individual signaling unit is registered by an owner of the individual signaling unit with the central control facility.

15. The apparatus of claim 14, wherein the predefined step is configurable by the registered owner at registration.

16. The apparatus of claim 15, wherein the predefined step is reconfigurable by the registered owner at any time after initial registration.

17. The apparatus of claim 1, wherein the central control facility includes a transceiver module in communication with at least one satellite.

18. The apparatus of claim 17, wherein the transceiver module is linked to server and data storage devices; the server and data storage devices adapted to process signals received from any one of said individual signaling units.

19. An infrastructure monitoring system, comprising:
a central control facility having a transceiver module in communication with at least one satellite and linked to server and data storage devices;
a plurality of geographically disparate individual signaling units each configured to remain in a passive standby state until activated and when activated to communicate wirelessly with the central control facility;
at least one event sensor communicatively coupled to at least one of the individual signaling units and configured to activate the at least one individual signaling unit when the at least one event sensor senses an event;

the server and data storage devices configured to process signals received from each individual signaling unit; and at least one output device communicatively coupled to the at least one individual signaling unit, the system configured to activate the at least one output device via the at least one individual signaling unit responsive to a predefined step taken by the central control facility responsive to the central control facility receiving an identification code from the at least one individual signaling unit upon activation.

20. An infrastructure monitoring system, comprising:

a central control facility;

a plurality of geographically disparate individual signaling units each configured to remain in a passive standby state until activated and when activated to communicate wirelessly with the central control facility, wherein each individual signaling unit is registered by an owner of that individual signaling unit with the central control facility;

at least one event sensor communicatively coupled to at least one of the individual signaling units and configured to activate the at least one individual signaling unit when the at least one event sensor senses an event; and at least one output device communicatively coupled to the at least one individual signaling unit, the system configured to activate the at least one output device via the at least one individual signaling unit responsive to a predefined step taken by the central control facility responsive to the central control facility receiving an identification code from the at least one individual signaling unit upon activation.

\* \* \* \* \*